United States Patent
Bowman et al.

(10) Patent No.: US 12,391,780 B2
(45) Date of Patent: Aug. 19, 2025

(54) NETWORK POLYMERS AND METHODS OF MAKING AND USING SAME

(71) Applicant: THE REGENTS OF THE UNIVERSITY OF COLORADO, A BODY CORPORATE, Denver, CO (US)

(72) Inventors: Christopher N. Bowman, Boulder, CO (US); Matthew K. Mcbride, Boulder, CO (US); Brady T. Worrell, Englewood, CO (US); Marvin Dion Alim, Kirkland, WA (US); Robert R. McLeod, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 317 days.

(21) Appl. No.: 17/431,670

(22) PCT Filed: Feb. 18, 2020

(86) PCT No.: PCT/US2020/018621
§ 371 (c)(1),
(2) Date: Aug. 17, 2021

(87) PCT Pub. No.: WO2020/172154
PCT Pub. Date: Aug. 27, 2020

(65) Prior Publication Data
US 2022/0119567 A1    Apr. 21, 2022

Related U.S. Application Data

(60) Provisional application No. 62/807,148, filed on Feb. 18, 2019.

(51) Int. Cl.
G03H 1/02    (2006.01)
C08F 220/30    (2006.01)
(Continued)

(52) U.S. Cl.
CPC ...... *C08F 220/301* (2020.02); *C08G 18/3876* (2013.01); *C08G 18/672* (2013.01);
(Continued)

(58) Field of Classification Search
None
See application file for complete search history.

(56) References Cited

U.S. PATENT DOCUMENTS 5,225,472 A    7/1993    Cameron et al.
5,342,724 A *  8/1994    Wilson ............... G03G 9/08755
                                                         430/908
(Continued)

FOREIGN PATENT DOCUMENTS

CN    108047369 A  *  5/2018    ............ C08F 120/36
EP    2740755 A1    6/2014
(Continued)

OTHER PUBLICATIONS

Fildes et al. "Formation of block copolymers form polyurethanes containing reactive disulfides", J. Poly. Sci., Pt. A-1, vol. 10, pp. 1515-161 (1972).*
(Continued)

*Primary Examiner* — Martin J Angebranndt
(74) *Attorney, Agent, or Firm* — Saul Ewing LLP; Domingos J. Silva; Dennis Ostrovsky

(57) ABSTRACT

The present invention provides in one aspect holographic materials comprising a covalent adaptable networks (CAN) matrix that has exchangeable crosslinks, and at least one writing monomer, wherein upon exposure to a stimulus, the holographic material can undergo photopolymerization and serve as a recording medium.

18 Claims, 6 Drawing Sheets

(51) Int. Cl.
*C08G 18/38* (2006.01)
*C08G 18/67* (2006.01)
*C08K 5/5397* (2006.01)

(52) U.S. Cl.
CPC ............ *C08K 5/5397* (2013.01); *G03H 1/02* (2013.01); *C08F 2438/03* (2013.01); *G03H 2001/0264* (2013.01); *G03H 2240/54* (2013.01); *G03H 2260/12* (2013.01)

(56) References Cited

U.S. PATENT DOCUMENTS

| | | | |
|---|---|---|---|
| 6,040,389 | A * | 3/2000 | Wideman ............... C08K 5/548 524/495 |
| 6,780,546 | B2 | 8/2004 | Trentler et al. |
| 6,864,019 | B2 | 3/2005 | Hegel et al. |
| 6,939,648 | B2 | 9/2005 | Dhar et al. |
| 7,671,145 | B2 | 3/2010 | Sawant et al. |
| 7,943,680 | B2 | 5/2011 | Bowman et al. |
| 8,323,854 | B2 | 12/2012 | Askham |
| 8,404,758 | B2 | 3/2013 | Bowman et al. |
| 8,658,332 | B2 | 2/2014 | Askham |
| 9,057,946 | B2 | 6/2015 | Facke et al. |
| 9,410,030 | B2 | 8/2016 | Joly et al. |
| 2003/0224250 | A1 | 12/2003 | Setthachayanon et al. |
| 2005/0049376 | A1 | 3/2005 | Chisholm et al. |
| 2005/0259303 | A1* | 11/2005 | Setthachayanon ...... G03F 7/001 359/15 |
| 2005/0261421 | A1 | 11/2005 | Schmitt et al. |
| 2006/0036110 | A1 | 2/2006 | Brown et al. |
| 2006/0194120 | A1* | 8/2006 | Cole ..................... G03F 7/001 430/1 |
| 2006/0195120 | A1 | 8/2006 | Nobles et al. |
| 2007/0078198 | A1 | 4/2007 | Otsuji et al. |
| 2007/0166625 | A1* | 7/2007 | Cole ..................... G03H 1/18 430/1 |
| 2007/0231744 | A1* | 10/2007 | Sasao ..................... G03F 7/001 430/1 |
| 2007/0240609 | A1* | 10/2007 | Husler ................ C07D 295/108 427/508 |
| 2007/0297944 | A1 | 12/2007 | Wendland et al. |
| 2008/0145545 | A1 | 6/2008 | Chisholm et al. |
| 2009/0023879 | A1 | 1/2009 | Wanders et al. |
| 2009/0054978 | A1 | 2/2009 | Wanders et al. |
| 2009/0092676 | A1 | 4/2009 | Richard et al. |
| 2010/0039685 | A1* | 2/2010 | Miki ..................... G11B 7/245 359/3 |
| 2010/0086860 | A1 | 4/2010 | Roelle et al. |
| 2010/0086861 | A1 | 4/2010 | Weiser et al. |
| 2011/0073171 | A1 | 3/2011 | Pickett |
| 2011/0189591 | A1* | 8/2011 | Weiser ................ C08G 18/089 430/2 |
| 2011/0236803 | A1 | 9/2011 | Weiser et al. |
| 2012/0214090 | A1* | 8/2012 | Weiser ............... C08G 18/4866 430/2 |
| 2012/0214895 | A1 | 8/2012 | Roelle et al. |
| 2012/0231377 | A1 | 9/2012 | Weiser et al. |
| 2012/0295288 | A1* | 11/2012 | Yu .................... G01N 33/57438 435/7.1 |
| 2012/0321998 | A1 | 12/2012 | Rölle et al. |
| 2013/0035414 | A1 | 2/2013 | Higgs et al. |
| 2013/0252140 | A1 | 9/2013 | Fäcke et al. |
| 2014/0295328 | A1 | 10/2014 | Weiser et al. |
| 2014/0303391 | A1* | 10/2014 | Fenoli ................ C07C 329/00 558/243 |
| 2015/0283039 | A1* | 10/2015 | Joly ..................... C09J 133/14 523/118 |
| 2016/0229800 | A1* | 8/2016 | Fornof ................... A61C 5/50 |
| 2018/0217312 | A1 | 8/2018 | Hiraoka et al. |
| 2018/0275603 | A1 | 9/2018 | Kikuchi et al. |
| 2020/0157271 | A1* | 5/2020 | Hwang ................ C08G 18/73 |
| 2021/0155599 | A1 | 5/2021 | Purvis et al. |
| 2021/0246266 | A1* | 8/2021 | Alim ..................... C08F 2/48 |
| 2021/0292482 | A1 | 9/2021 | Bowman et al. |
| 2022/0153693 | A1 | 5/2022 | Purvis et al. |
| 2022/0153895 | A1 | 5/2022 | Purvis et al. |
| 2022/0299867 | A1* | 9/2022 | Lane ..................... G03F 7/001 |
| 2022/0299868 | A1* | 9/2022 | Lane ..................... C08F 293/005 |
| 2022/0299938 | A1* | 9/2022 | Lane ..................... C08J 3/28 |

FOREIGN PATENT DOCUMENTS

| | | | | |
|---|---|---|---|---|
| EP | 2896644 | A1 | | 7/2015 |
| JP | 2006349770 | A | * | 12/2006 |
| JP | 2017014213 | A | | 1/2017 |
| WO | WO9422053 | A1 | | 9/1994 |
| WO | WO0116210 | A1 | | 3/2001 |
| WO | WO-2008125201 | A1 | * | 10/2008 .......... C07D 273/04 |
| WO | WO-2014074373 | A1 | * | 5/2014 .......... A61K 6/0023 |
| WO | 2017174545 | A1 | | 10/2017 |
| WO | 2018039331 | A1 | | 3/2018 |

OTHER PUBLICATIONS

Haddleton et al., "dihydroxy telegenic poly(methyl methacrylate) via—scission (radical addition fragmentation) chain transfer polymerization by macromonomer chain transfer agents, as prepared by catalytic chain transfer polymerization", Macrolmol. Chem. Phys., vol. 197 pp. 3027-3042 (1996).*

Paulusse et al., "Free Radical Polymers with Tunable and Selective Bio- and Chemical Degradability", J. Am. Chem. Soc., vol. 131(28) pp. 9805-9898-12 (Jun. 2009) (Year: 2009).*

"International Search Report and Written Opinion dated Sep. 9, 2019 for International Application No. PCT/US19/36375".

"International Search Report and Written Opinion dated Dec. 29, 2017 for PCT International Appln. No. PCT/US2017/048195".

"Supplementary European Search Report dated Mar. 27, 2020 for European Appln. No. EP 17 84 4337".

Alim, et al., "High Dynamic Range (delta n) Two-Stage Photopolymers via Enhanced Solubility of a High Refractive Index Acrylate Writing Monomer", ACS Appl Mater Interfaces, vol. 10, 2018, pp. 1217-1224.

Amamoto, et al., "Self-Healing of Covalently Cross-Linked Polymers by Reshuffling Thiuram Disulfide Moieties in Air under Visible Light", Adv. Mater., 24, 2012, 3975.

Ayres, et al., "Holographic Data Storage at 2+ Tbit/in 2", Bjelkhagen, H. I., Bove, V. M., Eds.; International Society for Optics and Photonics, vol. 9386, 2015, 93860G.

Bannin, et al., "Poly(thioester) by Organocatalytic Ring-Opening Polymerization", Macromolecules, 48, 2015, 5481.

Bruder, et al., "The Chemistry and Physics of Bayfol® HX Film Holographic Photopolymer", Polymers (Basel), 9 (10), 2017, 472.

Fenoli, C.R., et al., "Controllable Reversible Addition-Fragmentation Termination Monomers for Advances in Photochemically Controlled Covalent Adaptable Networks", Macromolecules, vol. 47, 2014, pp. 907-915.

Ghobril, et al., "A Dendritic Thioester Hydrogel Based on Thiol-Thioester Exchange as a Dissolvable Sealant System for Wound Closure", Angew. Chem. Int. Ed., 52, 2013, 14070.

Hoyle, et al., "Thiol-ene click chemistry", Angew. Chem. Int. Ed., 49, 2010, 1540.

Kade, et al., "The Power of Thiol-ene Chemistry", J. Polym. Sci., Part A: Polym. Chem., 48, 2010, 743.

Lei, et al., "Room-Temperature Self-Healable and Remoldable Cross-linked Polymer Based on the Dynamic Exchange of Disulfide Bonds", Chem. Mater., 26, 2038, 2014.

Lowe, "Thiol-ene "click" reactions and recent applications in polymer and materials synthesis: a first update", Polym. Chem., 5, 2014, 4820.

Lu, et al., "Investigations of step-growth thiol-ene polymerizations for novel dental restoratives", Dent. Mater. 21, 2005, 1129.

Nair, et al., "The Thiol-Michael Addition Click Reaction: A Powerful and Widely Used Tool in Materials Chemistry", Chem. Mater., 2013.

Peng, et al., "Facile Image Patterning via Sequential Thiol-Michael/Thiol-Yne Click Reactions", Chem. Mater., 26(23), 2014, 6819-6826.

(56) References Cited

OTHER PUBLICATIONS

Rekondo, et al., "Catalyst-free room-temperature self-healing elastomers based on aromatic disulfide metathesis", Mater. Horiz., 1, 2014, 237.
Salinas, et al., "Mixed Mode Thiol-Acrylate Photopolymerizations for the Synthesis of PEG-Peptide Hydrogels", Macromolecules, 41, 2008, 6019.
Shih, et al., "Crosslinking and degradation of step-growth hydrogels formed by thiol-ene photo-click chemistry", Biomacromolecules, 13, 2012, 2003.
Shipp, et al., "Elastomeric and degradable polyanhydride network polymers by step-growth thiol-ene photopolymerization", Chem. Commun., 2009, 6415.
Suzuki, et al., "Thiol-Mediated Controlled Ring-Opening Polymerization of Cysteine-Derived β-Thiolactone and Unique Features of Product Polythioester", Biomacromolecules, 17, 2016, 1135.
Yao, et al., "Thiol-yne click polymerization", Chinese Science Bulletin, vol. 58, No. 22, Aug. 2013, pp. 2711-2718.
"International Search Report and Written Opinion dated May 6, 2020 for International Application No. PCT/US2020/018621".

\* cited by examiner

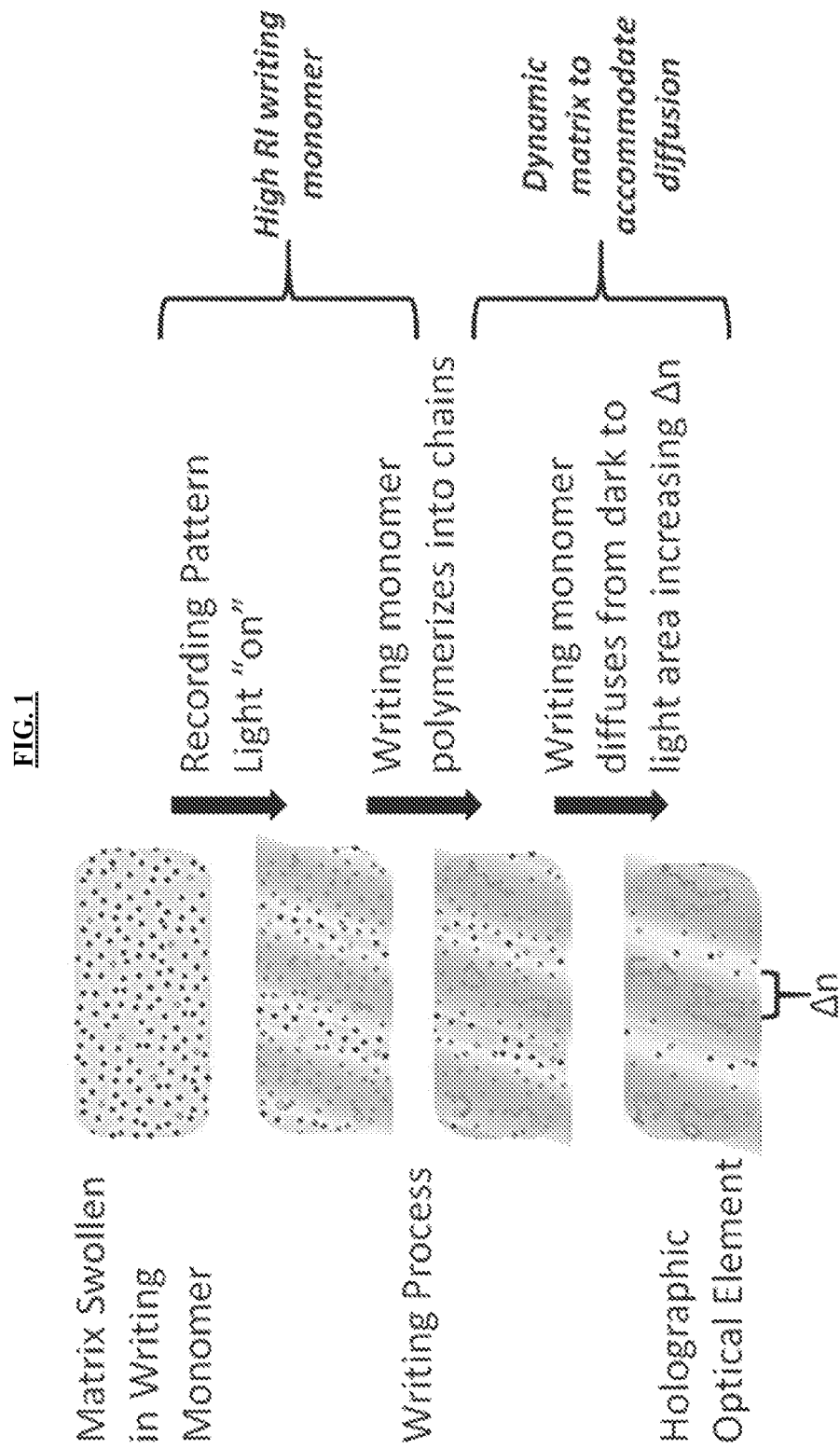

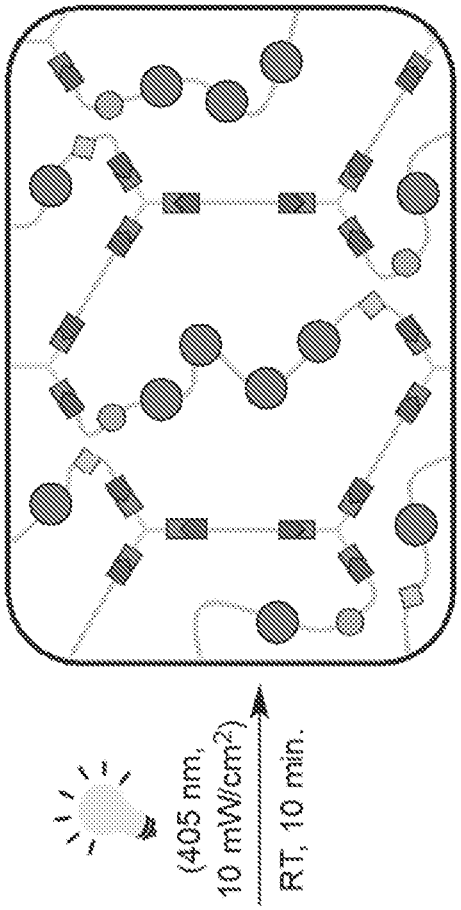
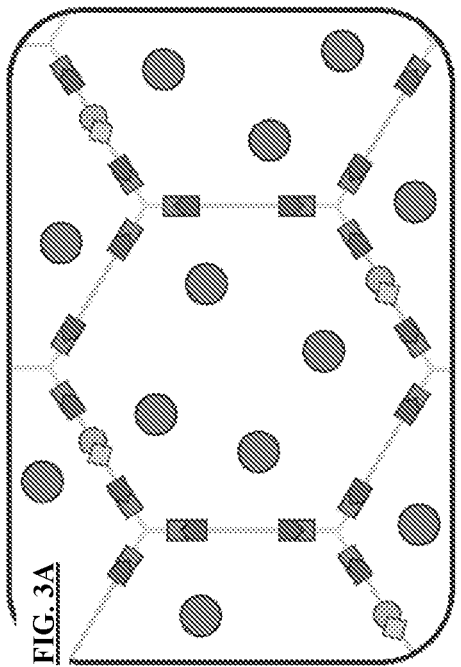
FIG. 3A
1st stage: x-linked network, swollen in acrylate → (405 nm, 10 mW/cm², RT, 10 min.) → 2nd stage: acrylate consumed, network rearranged
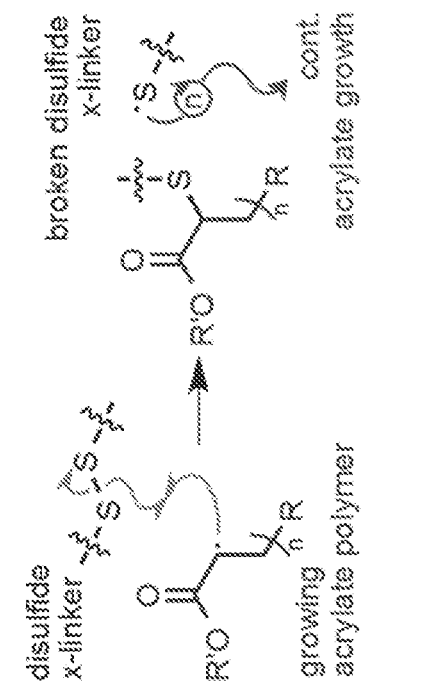
FIG. 3B
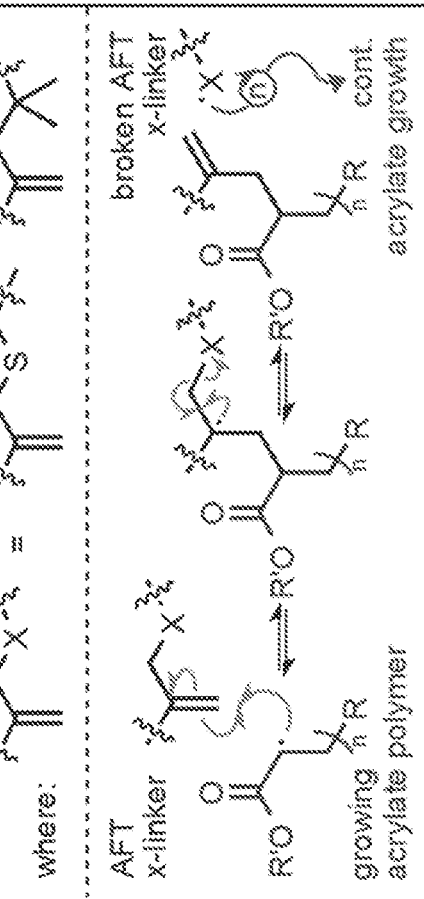
FIG. 3C

NETWORK POLYMERS AND METHODS OF MAKING AND USING SAME

CROSS-REFERENCE TO RELATED APPLICATIONS

The present application is a 35 U.S.C. § 371 national stage application from, and claims priority to, International Application No. PCT/US2020/018621, filed Feb. 18, 2020, which claims priority under 35 U.S.C. § 119 (e) to U.S. Provisional Application No. 62/807,148, filed Feb. 18, 2019, all of which are hereby incorporated by reference in their entireties herein.

STATEMENT REGARDING FEDERALLY SPONSORED RESEARCH OR DEVELOPMENT

This invention was made with government support under Grant Numbers DMR1420736 and CBET1264298 awarded by the National Science Foundation. The government has certain rights in the invention.

BACKGROUND OF THE INVENTION

Two-stage photopolymers are an ideal framework for designing materials capable of accessing a wide range of material properties (mechanical, thermal, optical, electrical, and so forth), on-demand using light. A valuable implementation of the two stage paradigm is in designing recording materials (often referred to as holographic photopolymers) for appropriate refractive index (phase) structures using various optical exposure techniques (such as photolithography, direct laser write (DLW), two-photon lithography, and holography) to generate a refractive index contrast ($\Delta n$) between the bulk material and the recorded feature(s). In particular, the advent of augmented reality (AR) devices has spurred a rising interest to use photopolymers to fabricate holographic optical elements (HOEs) capable of complex, yet high-quality, optical functions with thin, light, and flexible form factors.

There remains a need in the art for novel two-stage holographic photopolymer materials having improved recording performance. In certain embodiments, the novel materials comprise reactive groups that can be used in the second stage writing step only upon exposure to a stimulus, thereby preventing or suppressing unintended reactions between the matrix and incidental reactive materials within the photopolymer matrix. In other embodiments, the novel materials can minimize polymerization shrinkage, thereby enhancing index contrast. The present invention fulfills these needs.

BRIEF SUMMARY OF THE INVENTION

The invention provides a composition comprising a support matrix and at least one writing monomer, wherein the support matrix comprises a covalent adaptable network (CAN). In certain embodiments, the CAN comprises at least one first multifunctional monomer comprising at least two reactive end groups. In certain embodiments, the CAN comprises at least one second multifunctional monomer comprising at least one reversible addition-fragmentation chain transfer (RAFT) functionality in the monomer backbone and at least two reactive end groups capable of forming covalent bonds with the reactive end groups of the at least one first multifunctional monomer.

The invention further provides a method of making a holographic material. In certain embodiments, the method comprises forming a reaction mixture by contacting at least one of the following: (i) at least one first multifunctional monomer comprising at least two reactive end groups; (ii) at least one second multifunctional monomer comprising at least one reversible addition-fragmentation chain transfer (RAFT) functionality in the monomer backbone and at least two reactive end groups capable of forming a covalent bond with the reactive end groups of the at least one first multifunctional monomer; and (iii) at least one writing monomer. In certain embodiments, the method comprises polymerizing the reaction mixture such that the at least one first multifunctional monomer and the at least one second multifunctional monomer form a covalently bound support matrix, wherein the at least one writing monomer is unbound and capable of moving freely within the support matrix. In certain embodiments, the method comprises activating the RAFT functionalities in the at least one second multifunctional monomer in order to induce support matrix network rearrangement. In certain embodiments, the method comprises polymerizing the at least one writing monomer.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIG. 1 is a scheme showing a non-limiting general depiction of a pre-formed polymer matrix comprising a writing monomer according to certain embodiments of the invention. The polymer matrix is swollen with writing monomer, which can photopolymerize upon exposure to light of a proper wavelength. The writing monomer is free to migrate within the polymer matrix, such that the writing monomer congregates and polymerizes in the areas exposed to light.

FIG. 2A is a scheme showing a material of the invention comprising a triisocyanate first multifunctional monomer (1), a RAFT diol second multifunctional monomer (3), a poly-diol third multifunctional monomer (2), and a mono-acrylate writing monomer. FIGS. 2B-2D are a set of structures showing exemplary RAFT second multifunctional monomers, according to certain embodiments of the invention.

FIGS. 3A-3C are a set of schemes depicting the photo-activation of the RAFT functionalities of the matrix and the photopolymerization of the writing monomers, according to certain embodiments of the invention.

DETAILED DESCRIPTION OF THE INVENTION

Figure 2A:
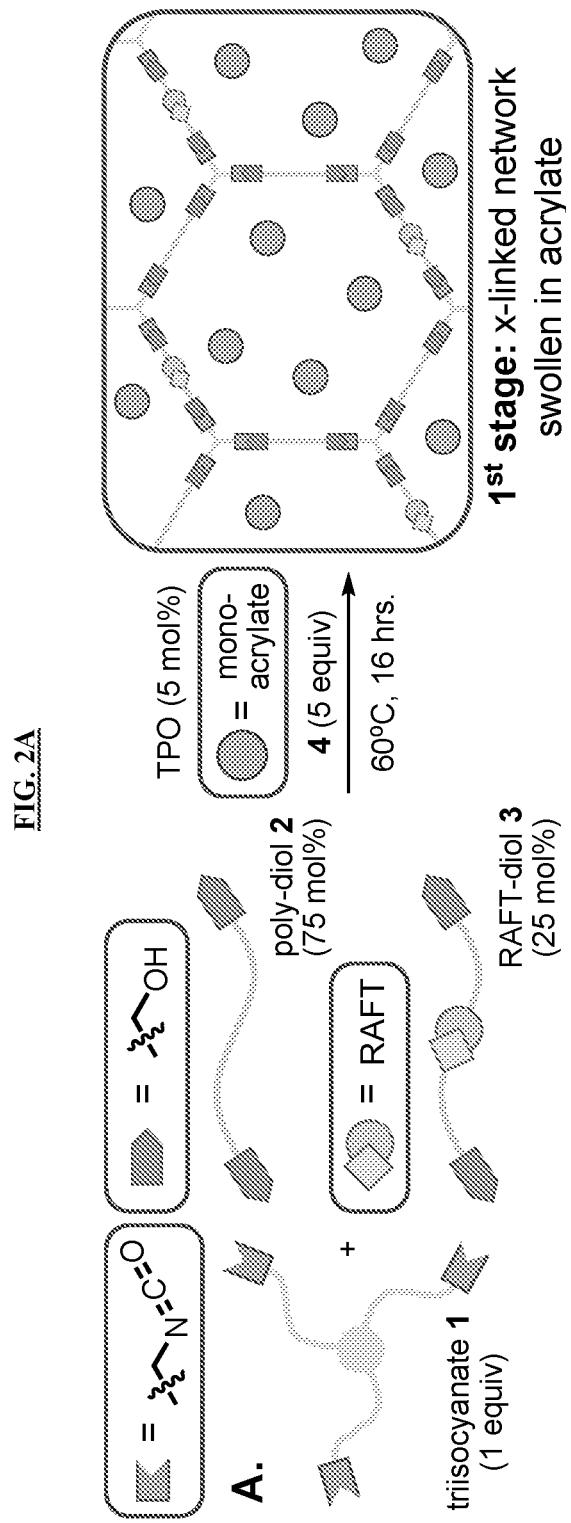
FIGS. 2A-2D are schemes and chemical structures depicting network polymers of the invention and building-blocks thereof.
Figure 2D:
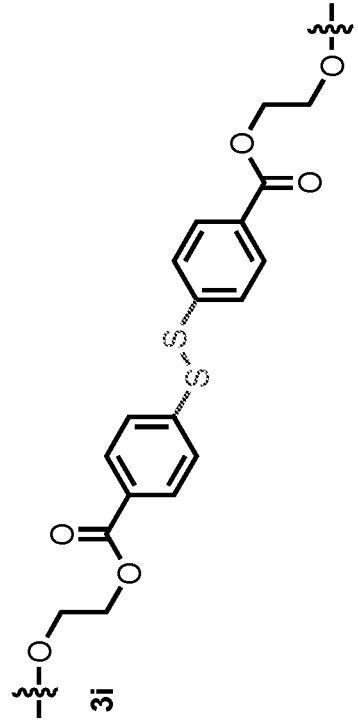
Figure 2B:
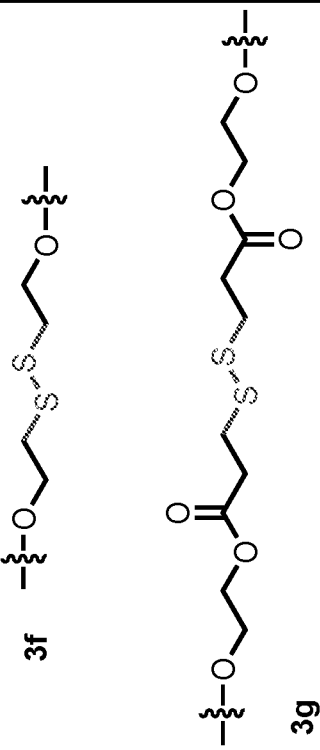
Figure 2C:
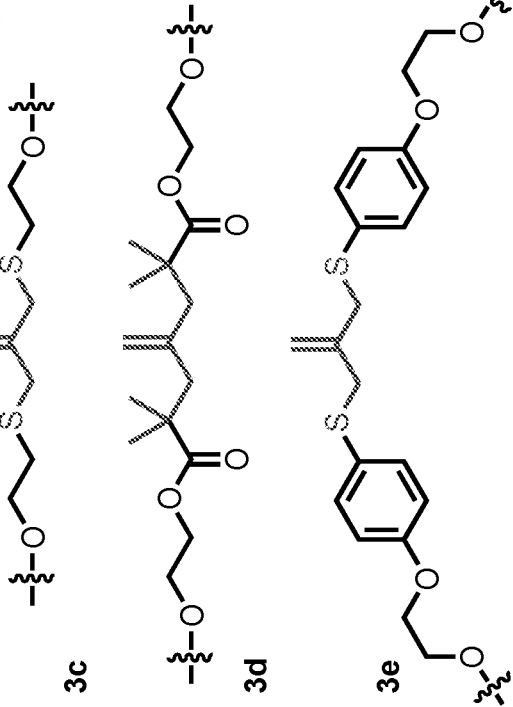

The present invention relates to the unexpected discovery of holographic materials comprising a covalent adaptable networks (CAN) matrix that has exchangeable crosslinks, and at least one writing monomer. In certain embodiments, upon exposure to a stimulus, the holographic material can undergo photopolymerization and serve as a recording medium.

Compounds and Compositions

In one aspect, the invention provides a composition comprising a support matrix and at least one writing monomer. In certain embodiments, the support matrix comprises a covalent adaptable network comprising at least one first multifunctional monomer comprising at least two reactive end groups. In other embodiments, the support matrix comprises a covalent adaptable network comprising at least one second multifunctional monomer comprising at least one reversible addition-fragmentation chain transfer (RAFT) functionality in the monomer backbone and at least two reactive end groups capable of forming a covalent bond with the reactive end groups of the at least one first multifunctional monomer.

In certain embodiments, the at least one first multifunctional monomer is selected from a difunctional monomer, a trifunctional monomer, and a tetrafunctional monomer. In other embodiments the at least one first multifunctional monomer comprises at least one end group that polymerizes ionically and/or in the presence of a Lewis acid catalyst. In yet other embodiments, the at least one first multifunctional monomer comprises at least one end group selected from the group consisting of an isocyanate group, cyanate group, epoxide group, Michael acceptor, primary amine, secondary amine, alcohol, thiol, carboxylic acid, aldehyde, azide, alkyne, cyclopentadiene, furan, and maleimide. In yet other embodiments, the at least one first multifunctional monomer is selected from the group consisting of Desmodur N3900, Desmodur N3300, Desmodur N3600, Desmodur N3800, Mondur 445, Mondur 448, Mondur 489, Mondur 582, Mondur 841, Mondur 1453, Mondur 1488, Mondur 1515, Mondur 1522, Mondur 1566, Mondur 3694, Mondur 3695, hexamethylene diisocyanate, trimethyl hexamethylene diisocyanate, methylene diphenyl diisocyanate, toluene diisocyanate, isophorone diisocyanate and any dimers, trimers, or regioisomers thereof. In yet other embodiments, the at least one first multifunctional monomer is selected from the group consisting of any DESMODUR®, BAYHYDUR®, DISPERCOLL®, BAYHYTHERM®, DESMOTHERM®, BAYBOND®, CRELAN®, DESMOCAP®, and DESMOSEAL® branded products sold by COVESTRO® AG (Kaiser-Wilhelm-Allee 60, 51373 Leverkusen, Germany).

In certain embodiments, the compositions and methods of U.S. Pat. Nos. 7,943,680; 8,404,758; 8,877,830; and 9,758,597 are incorporated herein by reference in their entireties.

In certain embodiments, the at least one first multifunctional monomer is a compound selected from the group consisting of:

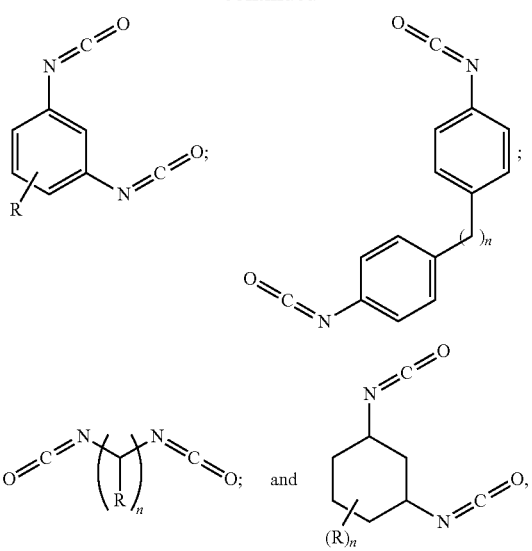

and any dimers, trimers, or regioisomers thereof, wherein R is selected from the group consisting of H and C1-C10 alkyl, and n is an integer from 1 to 6.

In certain embodiments, the at least one first multifunctional monomer is a compound selected from the group consisting of:

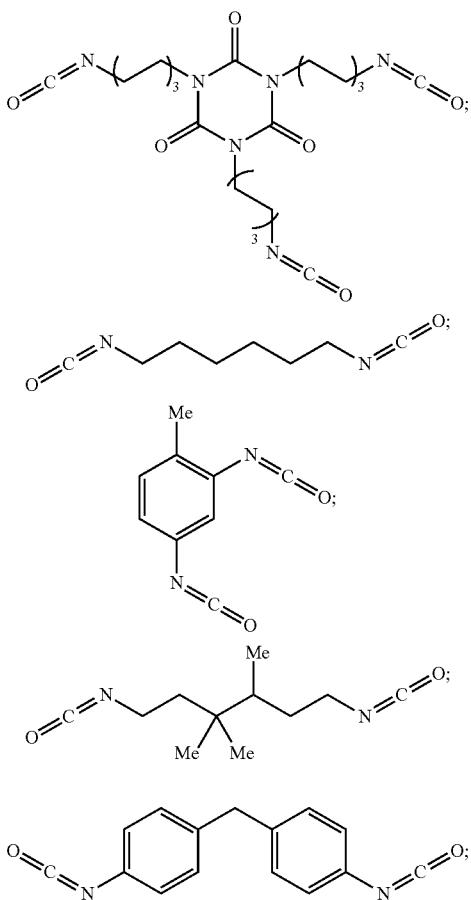

-continued

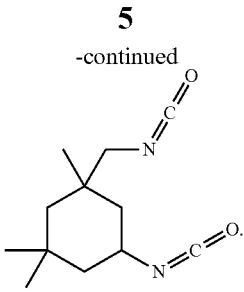

In certain embodiments, the at least one second multifunctional monomer is a compound of formula (I):

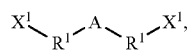   (I)

wherein:
A comprises a reversible addition-fragmentation chain transfer functionality; in certain embodiments, A is selected from the group consisting of

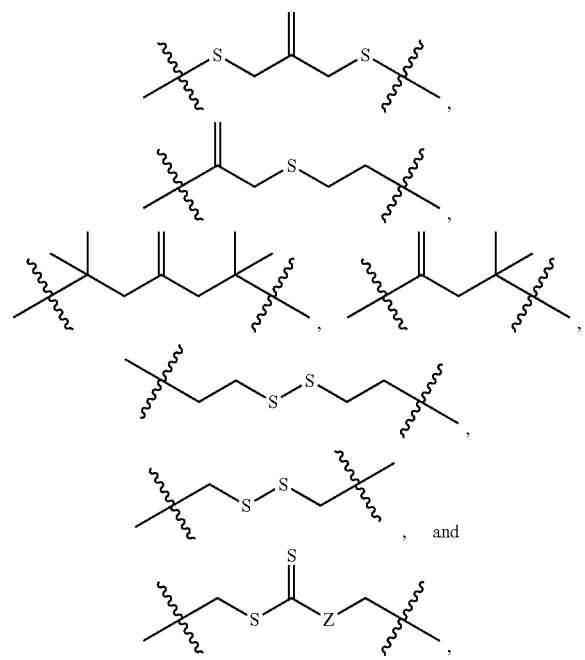

wherein Z is selected from the group consisting of N, C, O, and S;
each $R^1$ is independently selected from the group consisting of straight chain, branched, or aromatic hydrocarbon and may contain one or more heteroatoms; in certain embodiments, $R^1$ may be selected from the group consisting of

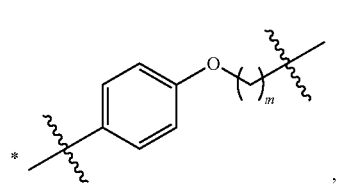

-continued

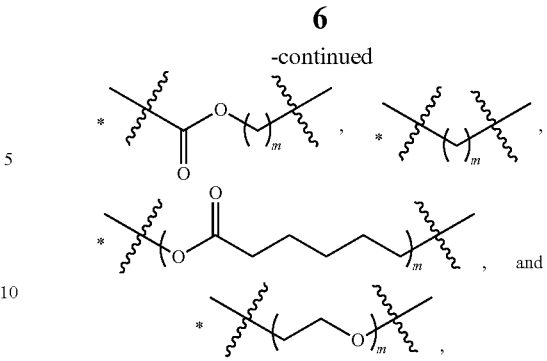

wherein the * denotes the point of attachment to A, and m is an integer ranging from 1 to 100; and
each $X^1$ is independently selected from the group consisting of —OH, —SH, primary amine, secondary amine, isocyanate, cyanate, Michael acceptor, vinyl, epoxide, carboxylic acid, aldehyde, azide, alkyne, cyclopentadiene, furan, and maleimide.

In certain embodiments, the at least one second multifunctional monomer is selected from the group consisting of:

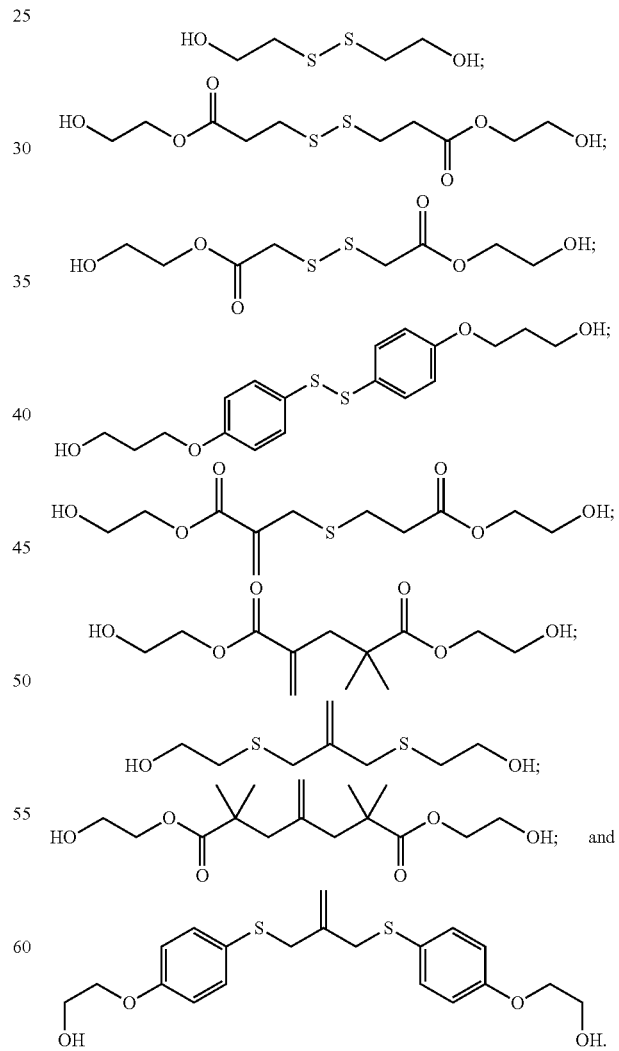

In certain embodiments, the at least one writing monomer is a compound capable of forming a covalent bond with the reversible addition-fragmentation chain transfer functionality (represented in certain embodiments as A elsewhere herein) of the second multifunctional monomer. In other embodiments, the at least one writing monomer is a compound capable of undergoing radical based homopolymerization. In yet other embodiments, the at least one writing monomer is a monofunctional monomer or a multifunctional monomer. In yet other embodiments, the at least one writing monomer is a compound having a refractive index equal to or greater than about 1.58. In yet other embodiments, the at least one writing monomer is a compound having a refractive index equal to or greater than about 1.6. In yet other embodiments, the at least one writing monomer is a compound having a refractive index equal to or greater than about 1.62. In yet other embodiments, the at least one writing monomer is a compound having a refractive index equal to or greater than about 1.64. In yet other embodiments, the at least one writing monomer is a compound having a refractive index equal to or greater than about 1.66. In yet other embodiments, the at least one writing monomer is a compound having a refractive index equal to or greater than about 1.68. In yet other embodiments, the at least one writing monomer is a compound having a refractive index equal to or greater than about 1.7.

In certain embodiments, the at least one writing monomer is at least one selected from the group consisting of an acrylate monomer and a methacrylate monomer. In other embodiments, the at least one writing monomer is at least one selected from the group consisting of tribromophenyl (meth)acrylate, pentabromophenyl (meth)acrylate, phenylthioethyl (meth)acrylate naphthylthioethyl (meth)acrylate, tritvlthioethyl (meth)acrylate,

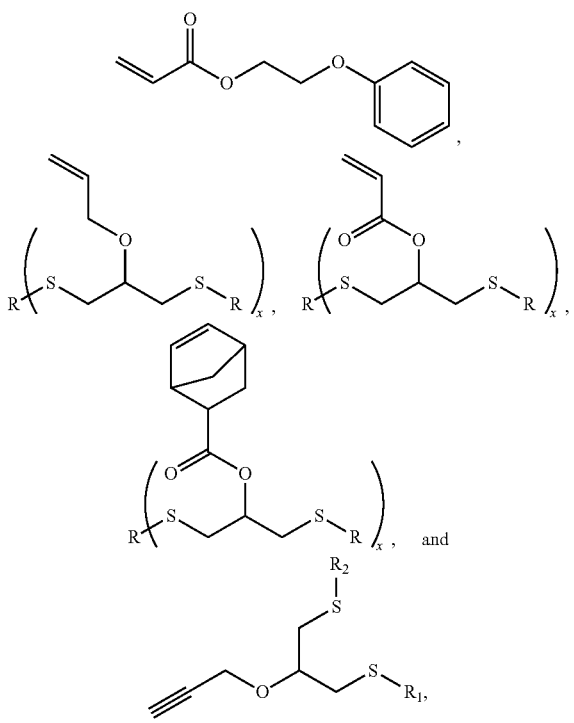

wherein x is an integer ranging from 1 to 1,000, and $R_1$ and $R_2$ are independently selected from the group consisting of monoaromatic and polyaromatic and may independently comprises at least one heteroatom (O, S, or N). $R_1$, and $R_2$ may be the same or different.

In certain embodiments, each occurrence of R is independently selected from the group consisting of:

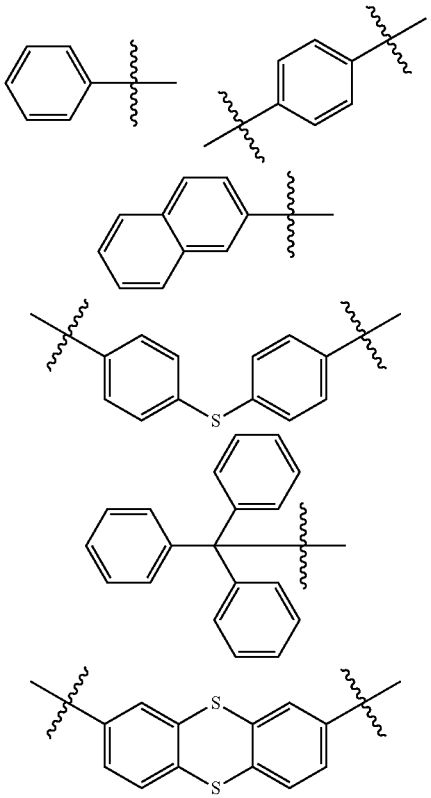

In certain embodiments, the support matrix further comprises at least one third multifunctional monomer comprising at least two reactive end groups capable of forming a covalent bond with the reactive end groups of the at least one first multifunctional monomer.

In other embodiments, the at least one third multifunctional monomer does not comprise any RAFT functionalities. In other embodiments, the at least one third multifunctional monomer comprises at least one end group selected from the group consisting of alcohol, thiol, isocyanate, cyanate, epoxide, Michael acceptor, vinyl, carboxylic acid, aldehyde, primary amine, secondary amine, azide, alkyne, cyclopentadiene, furan, and malemide. In yet other embodiments, the at least one third multifunctional monomer is selected from the group consisting of a straight chain alkane diol, straight chain perfluorocarbon diol, polycaprolactone diol, poly(tetrahydrofuran) diol, poly(caprolactone-co-tetrahydrofuran)diol, poly(ethylene glycol) diol, and poly(butadiene) diol.

In certain embodiments, the composition further comprises at least one polymerization initiator selected from the group consisting of a photoinitiator, a thermal initiator, and a redox initiator.

In certain embodiments, the at least one photoinitiator is selected from the group consisting of acetophenone, benzophenone, 2-phenylacetophenone, 2,2-dimethoxy-2-phenylacetophenone, Bis(2,4,6-trimethylbenzoyl)-phenylphosphineoxide, 2-Hydroxy-4'-(2-hydroxyethoxy)-2-methylpropiophenone, 2-methyl-(4-methylthienyl)-2-morpholinyl-1-propan-1-one, Diphenyl(2,4,6-trimethylbenzoyl)phosphine oxide, Ethyl (2,4,6-trimethylbenzoyl) phenyl phosphinate, lithium phenyl-2,4,6-trimethylbenzoylphosphinate,

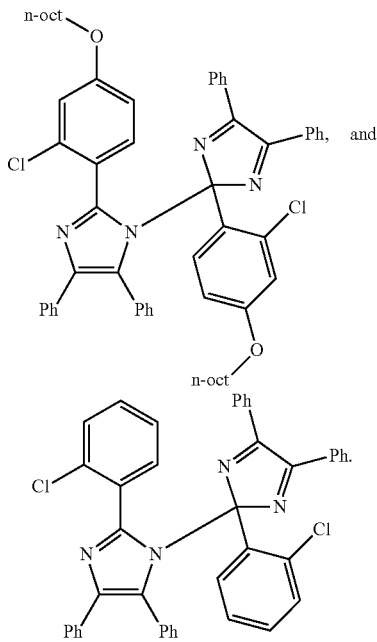

In certain embodiments, the at least one thermal initiator is selected from the group consisting of tert-Amyl peroxybenzoate, 4,4-Azobis(4-cyanovaleric acid), 1,1'-Azobis(cyclohexanecarbonitrile), 2,2'-Azobisisobutyronitrile (AIBN), Benzoyl peroxide, 2,2-Bis(tert-butylperoxy)butane, 1,1-Bis(tert-butylperoxy) cyclohexane, 2,5-Bis(tert-butylperoxy)-2,5-dimethylhexane, 2,5-Bis(tert-butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

In certain embodiments, the at least one redox initiator is selected from the group consisting of sodium iodide/hydrogen peroxide, potassium iodide/hydrogen peroxide, benzoyl peroxide/dimethyaniline, benzoyl peroxide/N,N-dimethyl p-toluidine, benzoyl peroxide/4-N,N-dimethylaminophenethyl alcohol, benzoyl peroxide/ethyl 4-dimethylaminobenzoate, glucose oxidase/oxygen/iron(II) sulfate, and copper (II) sulfate/sodium ascorbate.

In certain embodiments, at least a portion of the at least one first multifunctional monomer and the at least one second multifunctional monomer (and the optional third multifunctional monomer) are covalently bound, and none of the writing monomers are covalently bound to any other monomer in the composition. In other embodiments, the unbound writing monomers are capable of freely flowing through the covalently bound support matrix.

In certain embodiments, at least a portion of the at least one first multifunctional monomer and the at least one second multifunctional monomer (and the optional third multifunctional monomer) are covalently bound, and at least a portion of the writing monomer is covalently bound to at least a portion of the support matrix. In other embodiments, at least a portion of the writing monomer is covalently bound to at least a portion of the reversible addition-fragmentation chain transfer (RAFT) functionalities in the monomer backbone of the at least one second multifunctional monomer (and of the optional third multifunctional monomer).

In certain non-limiting embodiments, the concentrations and/or ratios of the various monomers in the support matrix are selected so as to provide the desired physical properties. In other embodiments, the concentration of the writing monomer is about 10-60% (wt/wt).

In certain embodiments, the composition further comprises a non-reactive counter diffusant. In other embodiments, the non-reactive counter diffusant is a compound having a refractive index equal to or lower than about 1.5. In yet other embodiments, the non-reactive counter diffusant is a compound having a refractive index equal to lower than about 1.45. In yet other embodiments, the non-reactive counter diffusant comprises at least one compound selected from the group consisting of 2,2,3,3,4,4,5,5,6,6,7,7,8,8,9,9-Hexadecafluorononyl butylcarbamate, 2,2,2-Trifluoroethylhexylcarbamate, Bis(1,1,1,3,3,3-hexafluoropropan-2-yl)-(2,2,4-trimethylhexane-1,6-diyl) biscarbamate, 2,2,3,3,4,4,5,5,6,6,7,7-Dodeca-fluoroheptyl butylcarbamate, 2,2,3,3,4,4,5,5,6,6,7,7-Dodeca-fluoroheptyl hexylcarbamate, 2,2,3,3,4,4,5,5,6,6,7,7-Dodeca-fluoroheptyl propan-2-ylcarbamate, 2,2,3,3,4,4,4-Heptafluorobutylhexylcarbamate, 2,2,3,3,4,4,5,5,6,6,7,7,8,8,9,9-Hexadecafluorononylhexylcarbamate, and 2,2,3,3,4,4,5,5,6,6,7,7,8,8,9,9-Hexadecafluorononylcy clohexylcarbamate.

In certain embodiments, the support matrix is formed by reacting the at least one first multifunctional monomer with the at least one second multifunctional monomer (and the optional third multifunctional monomer) through at least one polymer forming reaction. In other embodiments, the at least one polymer forming reaction is selected from the group consisting of a thermally initiated reaction, a light initiated reaction, and a redox initiated reaction. In yet other embodiments, the thermally initiated reaction is selected from the group consisting of alcohol-isocyanate, alcohol-thioisocyanate, thiol-isocyanate, thiol-thioisocyanate, amine-epoxy, alcohol-epoxy, thiol-epoxy, carboxylic acid-epoxy, thiol-Michael addition, amino-Michael addition, amine-isocyanate, epoxy homopolymerization, aldehyde-amine, any thermally promoted 3+2 or 4+2 cycloaddition reactions.

In certain embodiments, the RAFT functionalities of the support matrix are activated through at least one means selected from the group consisting of thermal initiation, photoinitiation and redox initiation. Activation of the RAFT functionalities enables increased diffusion by causing the network to behave as a liquid. Diffusion is known to be faster in liquids relative to a solid, static networks In certain embodiments, the at least one writing monomer is a photopolymerizable monomer. In other embodiments, the at least one writing monomer is polymerizable through any radical mediated polymerization method that is orthogonal to the method utilized to form the support matrix. In yet other embodiments, the at least one writing monomer is polymerizable through an activation method that is the same as the means used to activate the RAFT functionalities of the support matrix.

In certain embodiments, the activation of the RAFT functionalities and polymerization of the writing monomer are carried out simultaneously. In other embodiments, the activation of the RAFT functionalities and polymerization of the writing monomer are carried out in a highly localized manner. In yet other embodiments, portions of the composition wherein activation of the RAFT functionalities and polymerization of the writing monomer are carried out display a difference in refractive index when compared to non-activated areas. In yet other embodiments, portions of the composition wherein activation of the RAFT functionalities and polymerization of the writing monomer are carried out have higher refractive indices than non-activated areas.

Methods

In another aspect, the invention provides a method of making a holographic material of the invention.

In certain embodiments, the method comprises (a) forming a reaction mixture by contacting at least one of the following, or all of the following:
  (i) at least one first multifunctional monomer comprising at least two reactive end groups;
  (ii) at least one second multifunctional monomer comprising at least one reversible addition-fragmentation chain transfer (RAFT) functionality in the monomer backbone and at least two reactive end groups capable of forming a covalent bond with the reactive end groups of the at least one first multifunctional monomer; and
  (iii) at least one writing monomer.

In certain embodiments, the method comprises (b) polymerizing the reaction mixture such that the at least one first multifunctional monomer and the at least one second multifunctional monomer form a covalently bound support matrix, wherein the at least one writing monomer is unbound and capable of moving freely within the support matrix.

In certain embodiments, the method comprises (c) activating the RAFT functionalities in the at least one second multifunctional monomer in order to induce support matrix network rearrangement. In certain embodiments, the method comprises (c) optionally activating the RAFT functionalities in the at least one second multifunctional monomer in order to induce support matrix network rearrangement.

In certain embodiments, the method comprises (d) polymerizing the writing monomer.

In certain embodiments, the reaction mixture formed in step (a) further comprises at least one third multifunctional monomer comprising at least two reactive end groups capable of forming a covalent bond with the reactive end groups of the at least one first multifunctional monomer. In other embodiments, the at least one third multifunctional monomer does not comprise any RAFT functionalities. In yet other embodiments, the reaction mixture formed in step (a) further comprises a non-reactive counter diffusant. In yet other embodiments, the reaction mixture formed in step (a) further comprises at least one polymerization initiator.

In certain embodiments, the reaction mixture in step (b) is polymerized through at least one method selected from the group consisting of thermally initiated polymerization, photopolymerization, and redox initiated polymerization. In other embodiments, the thermally initiated reaction is selected from the group consisting of alcohol-isocyanate, alcohol-thioisocyanate, amine-isocyanate, thiol-isocyanate, thiol-thioisocyanate, amine-epoxy, alcohol-epoxy, thiol-epoxy, epoxy homopolymerization, aldehyde-amine, carboxylic acid-epoxy, thiol-Michael addition, amino-Michael addition, any thermally promoted 3+2 or 4+2 cycloaddition reactions. In yet other embodiments, the polymerization reaction in step (b) does not induce any appreciable or measurable polymerization of the writing monomer. In yet other embodiments, the polymerization reaction in step (b) does not induce any appreciable or measurable activation of the RAFT functionalities of the at least one second multifunctional monomer.

In certain embodiments, step (c) is carried out. In other embodiments, the RAFT functionalities are activated through at least one means selected from the group consisting of thermal initiation, photoinitiation, and redox initiation.

In certain embodiments, the writing monomer is polymerized selectively in step (d). In other embodiments, the writing monomer is polymerized in only select portions of the support matrix. In yet other embodiments, the writing monomer is polymerized through photopolymerization. In yet other embodiments, the writing monomer is polymerized through any radical mediated polymerization method.

In certain embodiments, the polymerization method in step (b) is orthogonal to both the method of activating the RAFT functionalities in step (c) and the polymerization method in step (d). In other embodiments, the method of activating the RAFT functionalities in step (c) also induces the polymerization of the writing monomer in step (d). In yet other embodiments, the method of activating the RAFT functionalities in step (c) and the method of inducing polymerization of the writing monomer in step (d) are orthogonal. In yet other embodiments, steps (c) and (d) are carried out simultaneously.

In certain embodiments wherein step (c) is carried out, polymerization of the writing monomer in step (d) comprises grafting of at least a portion of the at least one writing monomer to at least a portion of the activated RAFT functionalities of the at least one second multifunctional monomer.

Definitions

As used herein, each of the following terms has the meaning associated with it in this section.

Unless defined otherwise, all technical and scientific terms used herein generally have the same meaning as commonly understood by one of ordinary skill in the art to which this invention belongs. Generally, the nomenclature used herein and the laboratory procedures in cell culture, molecular genetics, and organic chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a concentration, a temporal duration, and the like, the term "about" is meant to encompass variations of 20% or +10%, more preferably +5%, even more preferably +10%, and still more preferably +0.10% from the specified value, as such variations are appropriate to perform the disclosed methods.

As used herein, the term "alkene monomer" or "alkene-based substrate" refers to a small molecule or a polymeric molecule comprising at least one reactive alkenyl group. An "alkenyl group" is an unsaturated, linear or branched or cyclic hydrocarbon group comprising at least one carbon-carbon double bond. In certain embodiments, the ene-based substrate comprises at least one alkenyl group (C=C).

As used herein, the term "alkyne monomer" or "alkyne-based substrate" refers to a small molecule or a polymeric molecule comprising at least one reactive alkynyl group. An "alkynyl group" is an unsaturated, linear or branched or cyclic hydrocarbon group comprising at least one carbon-carbon triple bond. In certain embodiments, the alkyne-based substrate comprises at least one terminal alkynyl group (—C≡CH).

As used herein, the term "depolymerization" refers to the reaction wherein a polymer is at least partially converted to at least one oligomer and/or a monomer, or an oligomer is at least partially converted to at least one smaller oligomer and/or a monomer.

The term "monomer" refers to any discreet chemical compound of any molecular weight.

As used herein, the term "Michael acceptor" refers to a molecule comprising a α,β-unsaturated R group, wherein R can be for example carbonyl, carboxylic acid, carboxamide, sulfone, sulfonamide, nitro, and other unsaturated group, whereby a nucleophile or base can add to the β-position of the α,β-unsaturated R group to form a covalent bond. Non-limiting examples of Michael acceptors include vinyl sulfones, methacrylates, and acrylates.

As used herein, the term "RAFT" refers to eversible addition-fragmentation chain transfer. As used herein, in a reversible chain cleavage process both chain cleavage and chain recombination occur. Recombination may occur through simple reversal of the chain cleavage reaction. In addition, the products of the chain cleavage reaction at one cleavage location are capable of participating in additional chain cleavage reactions, allowing combination of chain fragments from different cleavage locations and chain rearrangement. For example, the reversible chain cleavage process may be an addition-fragmentation process in which a radical reacts with an in-chain addition-fragmentation functionality to form an intermediate, which in turn fragments to reform the initial functionality and a new radical. The new radical may further react with another in-chain functionality or the initial functionality may further react with another radical generated by a different addition-fragmentation event. Chain rearrangement resulting from the reversible chain cleavage process can alter the topology of the network.

As used herein, the term "Type I photoinitiator" refers to a compound that undergoes a unimolecular bond cleavage upon irradiation to yield free radicals. Non-limiting examples of Type I photoinitiators are benzoin ethers, benzyl ketals, α-dialkoxy-acetophenones, α-hydroxy-alkylphenones, α-amino-alkylphenones and acyl-phosphine oxides.

As used herein, the term "Type II photoinitiator" refers to a combination of compounds that undergo a bimolecular reaction where the excited state of the photoinitiator interacts with a second molecule (often known as "co-initiator") to generate free radicals.

As used herein, the term "polymer" refers to a molecule composed of repeating structural units typically connected by covalent chemical bonds. The term "polymer" is also meant to include the terms copolymer and oligomers. In certain embodiments, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "polymerization" or "crosslinking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In certain embodiments, polymerization or crosslinking of at least one functional group results in about 100% consumption of the at least one functional group. In other embodiments, polymerization or crosslinking of at least one functional group results in less than about 100% consumption of the at least one functional group.

As used herein, the term "reaction condition" refers to a physical treatment, chemical reagent, or combination thereof, which is required or optionally required to promote a reaction. Non-limiting examples of reaction conditions are electromagnetic radiation (such as, but not limited to visible light), heat, a catalyst, a chemical reagent (such as, but not limited to, an acid, base, electrophile or nucleophile), and a buffer.

As used herein, the term "reactive" as applied to thiol, isocyanate, oxirane, alkyne or alkene groups indicate that these groups under appropriate conditions may take part in one or more reactions as defined in this application.

As used herein, the term "alkyl", by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is ($C_1$-$C_6$) alkyl, such as, but not limited to, ethyl, methyl, isopropyl, isobutyl, n-pentyl, n-hexyl and cyclopropylmethyl.

As used herein, the term "cycloalkyl", by itself or as part of another substituent means, unless otherwise stated, a cyclic chain hydrocarbon having the number of carbon atoms designated (i.e., $C_3$-$C_6$ means a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Most preferred is ($C_3$-$C_6$)cycloalkyl, such as, but not limited to, cyclopropyl, cyclobutyl, cyclopentyl and cyclohexyl.

As used herein, the term "alkenyl", employed alone or in combination with other terms, means, unless otherwise stated, a stable mono-unsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkynyl", employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers.

As used herein, the term "alkylene" by itself or as part of another substituent means, unless otherwise stated, a straight or branched hydrocarbon group having the number of carbon atoms designated (i.e., $C_1$-$C_{10}$ means one to ten carbon atoms) and includes straight, branched chain, or cyclic substituent groups, wherein the group has two open valencies. Examples include methylene, 1,2-ethylene, 1,1-ethylene, 1,1-propylene, 1,2-propylene and 1,3-propylene. Heteroalkylene substituents can a group consisting of the stated number of carbon atoms and one or more heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group.

As used herein, the term "alkenylene", employed alone or in combination with other terms, means, unless otherwise stated, a stable mono-unsaturated or di-unsaturated straight chain or branched chain hydrocarbon group having the stated number of carbon atoms wherein the group has two open valencies.

As used herein, the term "alkynylene", employed alone or in combination with other terms, means, unless otherwise stated, a stable straight chain or branched chain hydrocarbon group with a triple carbon-carbon bond, having the stated number of carbon atoms wherein the group has two open valencies.

As used herein, the term "substituted alkyl", "substituted cycloalkyl", "substituted alkenyl", "substituted alkynyl", "substituted alkylene", "substituted alkenylene" or "substituted alkynylene" means alkyl, cycloalkyl, alkenyl, alkynyl, alkylene, alkenylene, alkynylene as defined above, substituted by one, two or three substituents selected from the group consisting of $C_1$-$C_{10}$ alkyl, halogen, =O, —OH, alkoxy, tetrahydro-2-H-pyranyl, —$NH_2$, —$N(CH_3)_2$, (1-methyl-imidazol-2-yl), pyridin-2-yl, pyridin-3-yl, pyridin-4-yl, —C(=O)OH, trifluoromethyl, —C≡N, —C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, —C(=NH)$NH_2$, and —$NO_2$, preferably containing one or two substituents selected from halogen, —OH, alkoxy, —$NH_2$, trifluoromethyl, —$N(CH_3)_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are ($C_1$-$C_3$) alkoxy, such as, but not limited to, ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—$CH_2$—$CH_2$—$CH_3$, —$CH_2$—$CH_2$—$CH_2$—OH, —$CH_2$—$CH_2$—NH—$CH_3$, —$CH_2$—S—$CH_2$—$CH_3$, and —$CH_2CH_2$—S(=O)—$CH_3$. Up to two heteroatoms may be consecutive, such as, for example, —$CH_2$—NH—$OCH_3$, or —$CH_2$—$CH_2$—S—S—$CH_3$.

As used herein, the term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH=CH—O—$CH_3$, —CH=CH—$CH_2$—OH, —$CH_2$—CH=N—$OCH_3$, —CH=CH—N($CH_3$)—$CH_3$, and —$CH_2$—CH=CH—$CH_2$—SH.

As used herein, the term "aromatic" refers to a carbocycle or heterocycle with one or more polyunsaturated rings and having aromatic character, i.e. having (4n+2) delocalized D (pi) electrons, where n is an integer.

As used herein, the term "aryl", employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. Preferred are phenyl and naphthyl, most preferred is phenyl.

As used herein, the term "heterocycle" or "heterocyclyl" or "heterocyclic" by itself or as part of another substituent means, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group.

For aryl, aryl-($C_1$-$C_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two. In yet another embodiment, the substituents are independently selected from the group consisting of $C_{1-6}$ alkyl, —OH, $C_{1-6}$ alkoxy, halo, amino, acetamido and nitro. As used herein, where a substituent is an alkyl or alkoxy group, the carbon chain may be branched, straight or cyclic, with straight being preferred.

"Instructional material" as that term is used herein includes a publication, a recording, a diagram, or any other medium of expression that can be used to communicate the usefulness of the composition and/or compound of the invention in a kit. The instructional material of the kit may, for example, be affixed to a container that contains the compound and/or composition of the invention or be shipped together with a container that contains the compound and/or composition.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein: CAN(s) =covalent adaptable network(s); FT-IR=Fourier transform infrared spectroscopy; IR=infrared; NMR=nuclear magnetic resonance spectroscopy; RAFT=reversible addition-fragmentation chain transfer; UV=ultraviolet.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials and Methods

Fabrication of Two-Stage Photopolymer Films

For a formulation containing 25% AFT diol: A stock mixture of diol oligomer (1,485 mg), Phenoxyethyl Acrylate (SR339, Writing monomer—1,905 mg), and Diphenyl(2,4,6-trimethylbenzoyl)phosphine oxide (TPO, Photoinitiator—35 mg) was prepared in a 20 mL scintillation by mixing the 3 components and homogenizing with vortex. 1,9-Nonanediol (0.75 EQ, 0.297 mmol, 48 mg) and allyl sulfide diol (0.375 equiv, 0.149 mmol, 31 mg) were added to a 4 dram glass vial. 685 mg of the stock mixture (oligomer diol: 0.375 equiv, 0.149 mmol, 297 mg; SR339: 5 equiv, 1.982 mmol, 381 mg; TPO: 0.05 equiv, 0.02 mmol, 7 mg) was added to the 4 dram vial with the tri-isocyanate crosslinker (1 equiv, 0.396 mmol, 200 mg). The sample was mixed with gentle heating combined with vortexing and degassed with house vacuum. The sample was then deposited onto slides with plastic spacers (250 micron for DMA/FTIR, 20 micron for holographic samples) lining the perimeter and compressed between two slides using binder clips. The samples were then heated at 80° C. for 16 hours resulting in a rubbery polymer network swollen with acrylate writing monomer.

Stress Relaxation

The stress relaxation studies were performed on an TA RSA-G2 dynamic mechanical analyzer with a rectangular sample in tension (dimensions: 6.5×6×0.24 mm). The sample was stretched to 5% strain for 15 minutes. Light (400-500 nm filter on Hg Bulb, 15 mW/cm$^2$) was turned on for 5 minutes after an initial equilibrium period of 5 minutes).

Real-Time Near IR

Monitoring of the photopolymerization of the second stage acrylates was monitored in real time from the disappearance of the C=C peak (~6193 cm$^{-1}$) during exposure (400-500 nm filter on Hg Bulb, 15 mW/cm$^2$).

Holography

A two-beam interference setup was used to record volume transmission holograms with a spatially filtered wavelength-stabilized 405 nm laser diode (Ondax, 40 mW). Both recording beams (1/e$^2$ intensity diameter of 4.3 mm) were power-matched to give a total recording intensity of ~20 mW/cm$^2$. The beams were interfered at an external recording half-angle of 9.5° to produce a sinusoidal interference pattern with a fringe spacing of ~1.2 μm. A 633 nm He—Ne laser (Thorlabs), aligned approximately at the Bragg reconstruction angle, was used as a read beam to nondestructively probe the hologram formation throughout the recording process. Each recording exposure is initially monitored for 300 s and then followed by a sample rotation from 15° to −15° at an angle increment of 0.05°. The optical power at both detectors was measured throughout the experiment. The diffraction efficiency of each recorded hologram was calculated by taking the quotient of the diffracted power ($P_d$) to the total power (transmitted+diffracted), $DE=I_d/(I_d+I_t)$. The diffraction efficiency versus angle profile was fitted to Kogelnik coupled wave theory to obtain a peak-to-mean $\Delta n$ and thickness (d).

Example 1: Design and Fabrication of Covalent Adaptable Network Two-Stage Photopolymers The CAN-based photopolymers of the invention deviate from traditional 2-stage holographic photopolymers because they effectively combine and bridge the properties of a thermoset (when not recording the hologram) and a thermoplastic (while recording the hologram). The properties of a thermoset imbues the polymer with toughness, thermal/dimensional stability, and solvent resistance, while providing easy to handle/scalable films for the 2nd stage writing step. Despite these benefits, classic thermosetting 1st stage matrices have static crosslinking density which disallows maximum refractive index modulation during the 2nd stage recording due to limited diffusion of the acrylate through the matrix. Thermoplastics are much more effective in allowing for diffusion of the acrylate monomer during 2nd stage recording of the hologram, however, the written holograms suffer from poor shelf-life, reduced thermal/dimensional stability, and modest solvent/environmental resilience. 2-stage holographic CAN photopolymers of the invention that include dynamic crosslinks bridge the two worlds of thermosets and thermoplastics, allowing for the polymer to act as a thermoplastic while the light is on and act as a thermoset when the light is off. Therefore, these CAN photopolymers have excellent stability before and after recording while having maximum refractive index modulation during recording.

Figure 4:
FIG. 4 illustrates shows an image of the hologram was prepared according to the procedure with 75% of the diol containing the AFT agent and 2-phenoxyethyl acrylate as the writing monomer.

FIG. 4 shows an image of the hologram prepared according to the procedure with 75% of the diol containing the AFT agent and 2-phenoxyethyl acrylate as the writing monomer.

Figure 5:
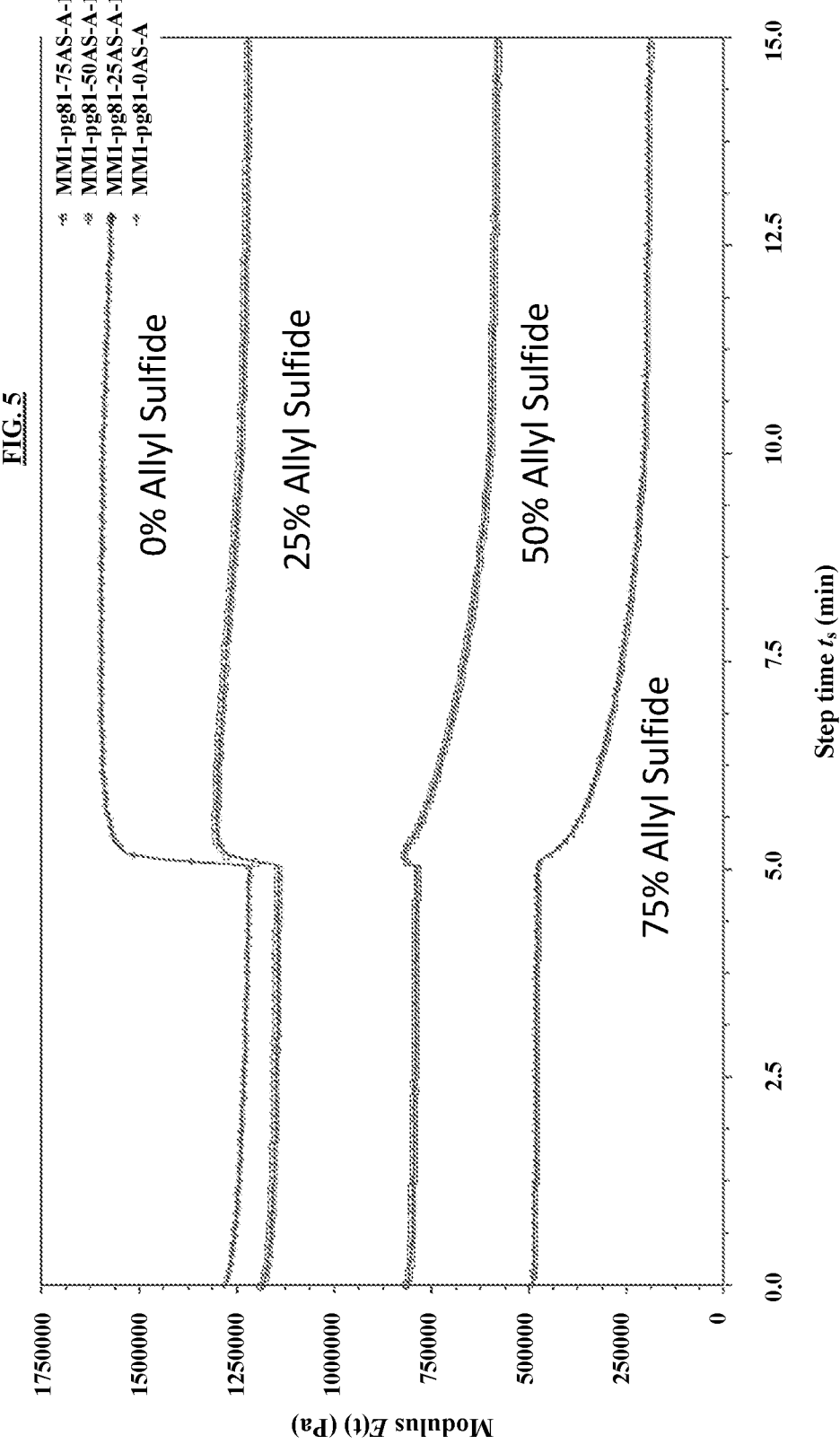
FIG. 5 is a graph showing the relaxation modulus of materials having 0%, 25%, 50% or 75% RAFT functionalities. This graph demonstrates the effect of allyl sulfides on the mechanical properties of the overall material. The stress increased from polymerization of acrylates and decreased from allyl sulfide breaking/rearrangement.

FIG. 5 shows the liquid like behavior in the dual curing networks functionalized with AFT and containing 30 wt % 2-phenoxyethyl acrylate writing monomer. When AFT is activated, the network relaxes stress similar to a liquid. In a static network (0% AFT), the polymerization of the second stage causes an increase in the stress which is detrimental to the quality of holograms. This stress is dissipated in networks with increasing AFT (25-75% AFT monomer). This liquid like behavior improves the capabilities of the material to write holograms.

ENUMERATED EMBODIMENTS

The following exemplary embodiments are provided, the numbering of which is not to be construed as designating levels of importance:

Embodiment 1 provides a composition comprising a support matrix and at least one writing monomer, wherein the support matrix comprises a covalent adaptable network comprising: a) at least one first multifunctional monomer comprising at least two reactive end groups; and b) at least one second multifunctional monomer comprising at least one reversible addition-fragmentation chain transfer (RAFT) functionality in the monomer backbone and at least two reactive end groups capable of forming covalent bonds with the reactive end groups of the at least one first multifunctional monomer.

Embodiment 2 provides the composition of Embodiment 1, wherein the at least one first multifunctional monomer is selected from the group consisting of a difunctional monomer, a trifunctional monomer, and a tetrafunctional monomer.

Embodiment 3 provides the composition of any of Embodiments 1-2, wherein the at least one first multifunctional monomer comprises at least one end group selected from the group consisting of a isocyanate group, a cyanate group, an epoxide group, a Michael acceptor, a primary amine, a secondary amine, an alcohol, a thiol, a carboxylic acid, an aldehyde, an azide, an alkyne, a cyclopentadiene, a furan, and a maleimide.

Embodiment 4 provides the composition of any of Embodiments 1-3, wherein the at least one first multifunctional monomer is selected from the group consisting of Desmodur N3900, Desmodur N3300, Desmodur N3600, Desmodur N3800, Mondur 445, Mondur 448, Mondur 489, Mondur 582, Mondur 841, Mondur 1453, Mondur 1488, Mondur 1515, Mondur 1522, Mondur 1566, Mondur 3694, Mondur 3695, hexamethylene diisocyanate, trimethyl hexamethylene diisocyanate, methylene diphenyl diisocyanate, toluene diisocyanate, isophorone diisocyanate, and any dimers and trimers thereof.

Embodiment 5 provides the composition of any of Embodiments 1-4, wherein the at least one second multifunctional monomer is a compound of formula (I):

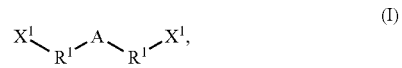

wherein: A comprises a reversible addition-fragmentation chain transfer functionality; each R is independently selected from the group consisting of straight chain, branched, or aromatic hydrocarbon and may contain one or more heteroatoms; and each $X^1$ is independently selected from the group consisting of —OH, —SH, primary amine, secondary amine, isocyanate, cyanate, Michael acceptor, vinyl, epoxide, carboxylic acid, aldehyde, azide, alkyne, cyclopentadiene, furan, and maleimide.

Embodiment 6 provides the composition of any of Embodiments 1-5, wherein the at least one second multifunctional monomer is selected from the group consisting of

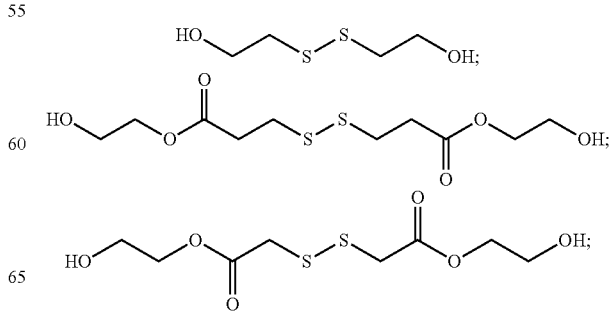

-continued

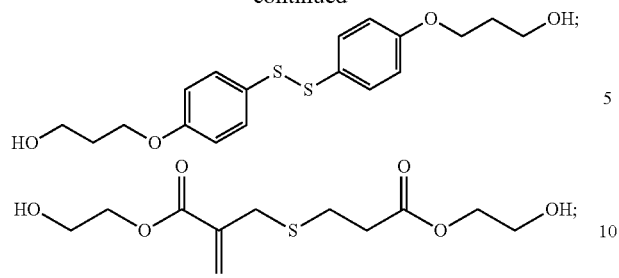

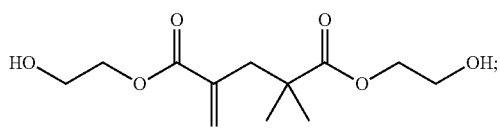

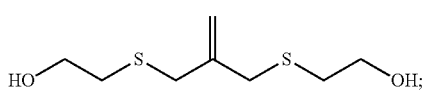

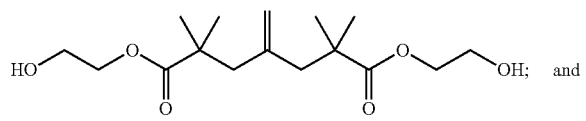

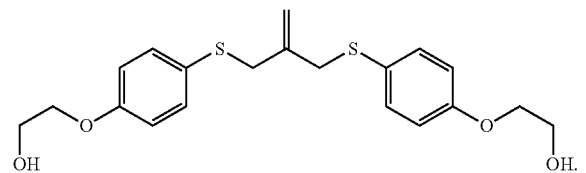

Embodiment 7 provides the composition of any of Embodiments 1-6, wherein the at least one writing monomer is at least one selected from the group consisting of an acrylate monomer and a methacrylate monomer.

Embodiment 8 provides the composition of any of Embodiments 1-7, wherein the at least one writing monomer is at least one selected from the group consisting of tribromophenyl (meth)acrylate, pentabromophenyl (meth)acrylate, phenylthioethyl (meth)acrylate, naphthylthioethyl (meth)acrylate, tritylthioethyl (meth)acrylate,

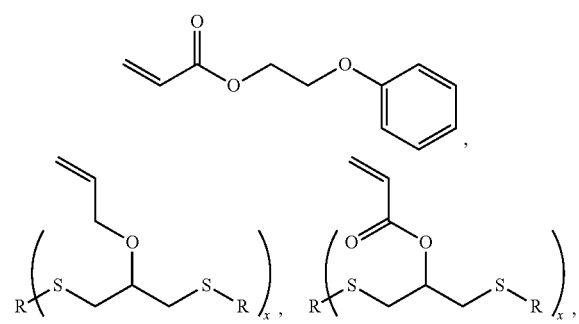

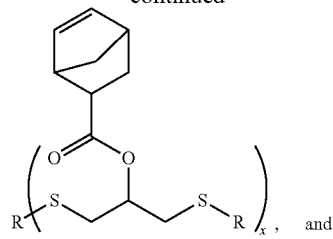

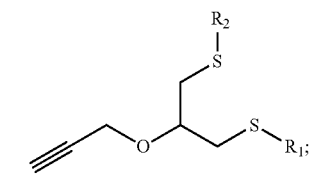

wherein x is an integer ranging from 1 to 1,000; and wherein R, $R_1$, and $R_2$ are the same or different, and are independently selected from the group consisting of monoaromatic and polyaromatic and may independently comprise at least one heteroatom (O, S, or N).

Embodiment 9 provides the composition of any of Embodiments 1-8, wherein the at least one writing monomer has a refractive index equal to or above about 1.58.

Embodiment 10 provides the composition of any of Embodiments 1-9, wherein the support matrix further comprises at least one third multifunctional monomer comprising at least two reactive end groups capable of forming a covalent bond with the reactive end groups of the at least one first multifunctional monomer; wherein the at least one third multifunctional monomer does not comprise any RAFT functionalities.

Embodiment 11 provides the composition of any of Embodiments 1-10, wherein the at least one third multifunctional monomer comprises at least one end group selected from the group consisting of alcohol, thiol, isocyanate, cyanate, epoxide, Michael acceptor, vinyl, carboxylic acid, aldehyde, primary amine, secondary amine, azide, alkyne, cyclopentadiene, furan, and malemide.

Embodiment 12 provides the composition of any of Embodiments 1-11, wherein the at least one third multifunctional monomer is selected from the group consisting of a straight chain alkane diol, a straight chain perfluorocarbon diol, a polycaprolactone diol, a poly(tetrahydrofuran) diol, a poly(caprolactone-co-tetrahydrofuran) diol, a poly(ethylene glycol) diol, and a poly(butadiene) diol.

Embodiment 13 provides the composition of any of Embodiments 1-12, further comprising at least one polymerization initiator selected from the group consisting of a photoinitiator, a thermal initiator, and a redox initiator.

Embodiment 14 provides the composition of Embodiment 13, wherein the at least one photoinitiator is selected from the group consisting of acetophenone, benzophenone, 2-phenylacetophenone, 2,2-dimethoxy-2-phenylacetophenone, Bis(2,4,6-trimethylbenzoyl)-phenylphosphineoxide, 2-Hydroxy-4'-(2-hydroxyethoxy)-2-methylpropiophenone, 2-methyl-(4-methylthienyl)-2-morpholinyl-1-propan-1-one, Diphenyl(2,4,6-trimethylbenzoyl)phosphine oxide, Ethyl (2,4,6-trimethylbenzoyl) phenyl phosphinate, lithium phenyl-2,4,6-trimethylbenzoylphosphinate,

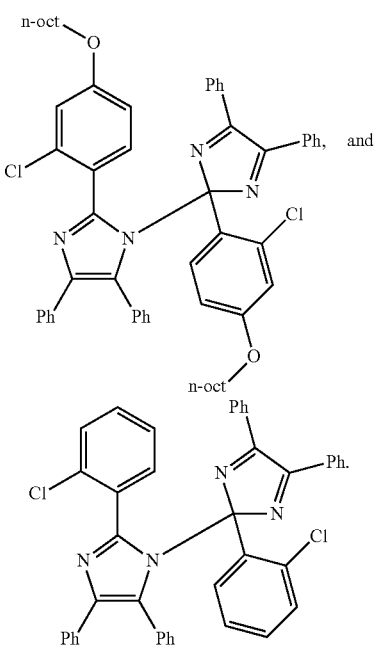

Embodiment 15 provides the composition of Embodiment 13, wherein the at least one thermal initiator is selected from the group consisting of tert-Amyl peroxybenzoate, 4,4'-Azobis(4-cyanovaleric acid), 1,1'-Azobis(cyclohexanecarbonitrile), 2,2'-Azobisisobutyronitrile (AIBN), Benzoyl peroxide, 2,2-Bis(tert-butylperoxy)butane, 1,1-Bis(tert-butylperoxy) cyclohexane, 2,5-Bis(tert-butylperoxy)-2,5-dimethylhexane, 2,5-Bis(tert-butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

Embodiment 16 provides the composition of Embodiment 13, wherein the at least one redox initiator is selected from the group consisting of sodium iodide/hydrogen peroxide, potassium iodide/hydrogen peroxide, benzoyl peroxide/dimethyaniline, benzoyl peroxide/N,N-dimethyl p-toluidine, benzoyl peroxide/4-N,N-dimethylaminophenethyl alcohol, benzoyl peroxide/ethyl 4-dimethylaminobenzoate, glucose oxidase/oxygen/iron(II) sulfate, and copper(II) sulfate/sodium ascorbate.

Embodiment 17 provides the composition of any of Embodiments 1-16, wherein at least a portion of the at least one first multifunctional monomer and the at least one second multifunctional monomer are covalently bound, and wherein none of the writing monomers are covalently bound to any other monomer in the composition.

Embodiment 18 provides the composition of any of Embodiments 1-17, wherein at least a portion of the at least one first multifunctional monomer and the at least one second multifunctional monomer are covalently bound, and wherein at least a portion of the writing monomer is covalently bound to at least a portion of the reversible addition-fragmentation chain transfer (RAFT) functionalities in the monomer backbone of the at least one second multifunctional monomer.

Embodiment 19 provides the composition of any of Embodiments 1-18, further comprising a non-reactive counter diffusant.

Embodiment 20 provides the composition of Embodiment 1-19, wherein the non-reactive counter diffusant is a compound having a refractive index equal to or lower than about 1.5.

Embodiment 21 provides a method of making a holographic material, the method comprising:
(a) forming a reaction mixture by contacting: (i) at least one first multifunctional monomer comprising at least two reactive end groups; (ii) at least one second multifunctional monomer comprising at least one reversible addition-fragmentation chain transfer (RAFT) functionality in the monomer backbone and at least two reactive end groups capable of forming a covalent bond with the reactive end groups of the at least one first multifunctional monomer; and (iii) at least one writing monomer;
(b) polymerizing the reaction mixture such that the at least one first multifunctional monomer and the at least one second multifunctional monomer form a covalently bound support matrix, wherein the at least one writing monomer is unbound and capable of moving freely within the support matrix;
(c) optionally, activating the RAFT functionalities in the at least one second multifunctional monomer in order to induce support matrix network rearrangement;
(d) polymerizing the at least one writing monomer.

Embodiment 22 provides the method of Embodiment 21, wherein the reaction mixture formed in step (a) further comprises at least one additional component selected from the group consisting of a non-reactive counter diffusant, at least one polymerization initiator and at least one third multifunctional monomer comprising at least two reactive end groups capable of forming a covalent bond with the reactive end groups of the at least one first multifunctional monomer, wherein the third multifunctional monomer does not comprise any RAFT functionalities.

Embodiment 23 provides the method of any of Embodiments 21-22, wherein the reaction mixture in step (b) is polymerized through at least one method selected from the group consisting of thermally initiated polymerization, photopolymerization, and redox initiated polymerization.

Embodiment 24 provides the method of any of Embodiments 21-23, wherein the reaction mixture in step (b) is polymerized through at least one thermally initiated polymerization selected from the group consisting of alcohol-isocyanate, alcohol-thioisocyanate, thiol-isocyanate, thiol-thioisocyanate, amine-epoxy, alcohol-epoxy, thiol-epoxy, carboxylic acid-epoxy, thiol-ene, thiol-Michael, amino-Michael, any thermally promoted 3+2 or 4+2 cycloaddition reactions.

Embodiment 25 provides the method of any of Embodiments 21-24, wherein step (c) is carried out and the RAFT functionalities are activated through at least one means selected from the group consisting of thermal initiation, photoinitiation, and redox initiation.

Embodiment 26 provides the method of any of Embodiments 21-25, wherein the at least one writing monomer is polymerized with spatial selectivity in step (d).

Embodiment 27 provides the method of any of Embodiments 21-26, wherein the at least one writing monomer is polymerized through photopolymerization in step (d).

Embodiment 28 provides the method of any of Embodiments 21-27, wherein the polymerization in step (b) does not induce polymerization of the writing monomer and does not activate any of the RAFT functionalities of the at least one second multifunctional monomer.

Embodiment 29 provides the method of any of Embodiments 21-28, wherein steps (c) and (d) are carried out simultaneously, wherein the activation of the RAFT functionalities of the at least one second multifunctional monomer also induces polymerization of the at least one writing monomer.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A composition comprising a support matrix and at least one writing monomer,
   wherein the support matrix consists of a covalent adaptable network that is a reaction product of at least one first multifunctional monomer, at least one second multifunctional monomer, and at least one third multifunctional monomer,
   wherein:
   a) the at least one first multifunctional monomer is selected from the group consisting of:

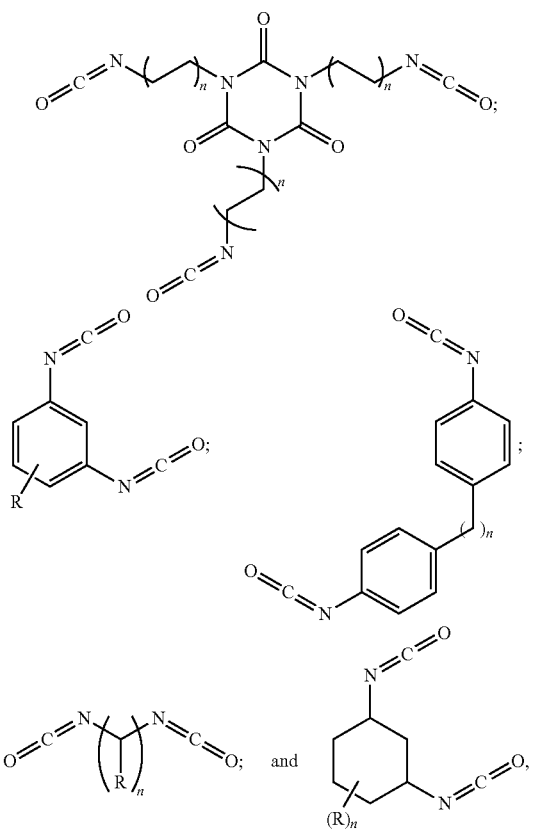

wherein in (a):
   each occurrence of R is independently selected from the group consisting of H and $C_1$-$C_{10}$ alkyl;
   each occurrence of n is independently 1, 2, 3, 4, 5, or 6;

b) the at least one second multifunctional monomer is a compound of Formula (I):

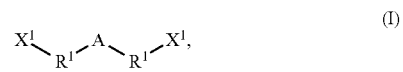

wherein:
   A is

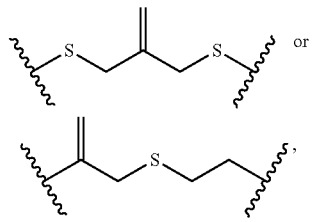

$R^1$ is selected from the group consisting of

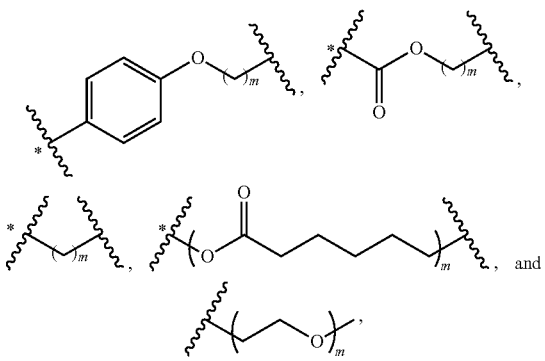

wherein the * denotes the point of attachment to A,
   $X^1$ is OH,
   m is an integer from 1 to 100;
   and c) the at least one third multifunctional monomer is selected from the group consisting of a straight chain perfluorocarbon diol, a polycaprolactone diol, a poly (tetrahydrofuran) diol, a poly (caprolactone-co-tetrahydrofuran) diol, a poly (ethylene glycol) diol, and a poly (butadiene) diol;
   wherein in the reaction product, the at least one first multifunctional monomer crosslinks at least one second multifunctional monomer and at least one third multifunctional monomer;
   wherein the composition further comprises at least one non-reactive counter diffusant;
   wherein at least a portion of the support matrix is swollen with at least one writing monomer selected from the group consisting of tribromophenyl (meth) acrylate, pentabromophenyl (meth) acrylate, phenylthioethyl (meth) acrylate, naphthylthioethyl (meth) acrylate, tritylthioethyl (meth) acrylate,

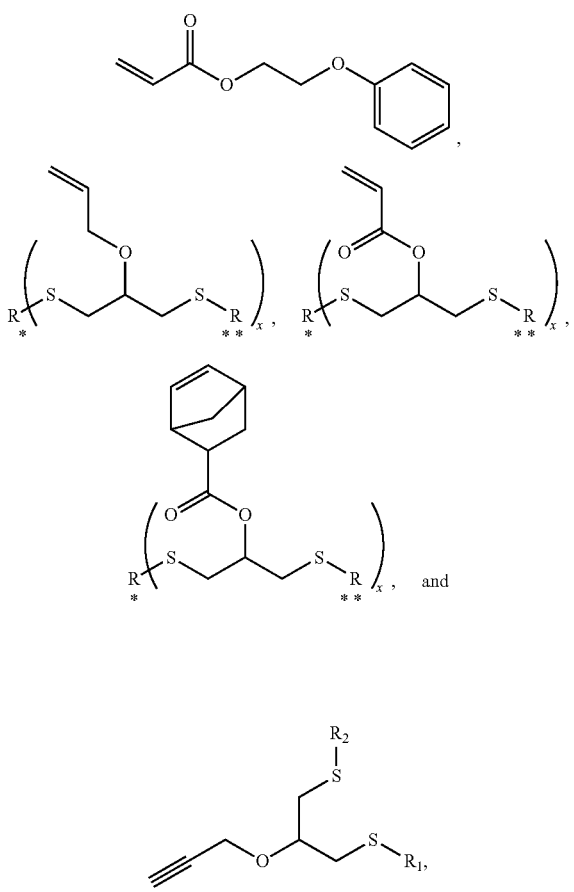

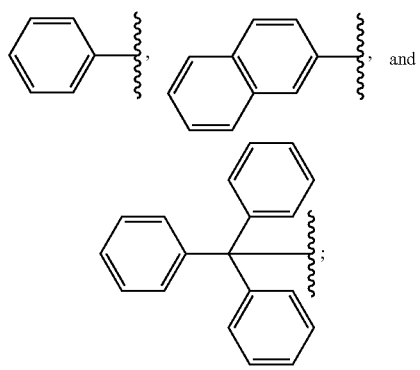

wherein in the at least one writing monomer:

R$_1$ and R$_2$ are independently selected from the group consisting of:

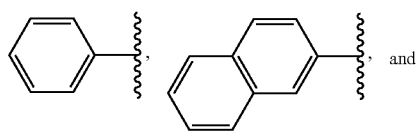

x is 1, and R groups marked with '*' and '**' are independently selected from the group consisting of:

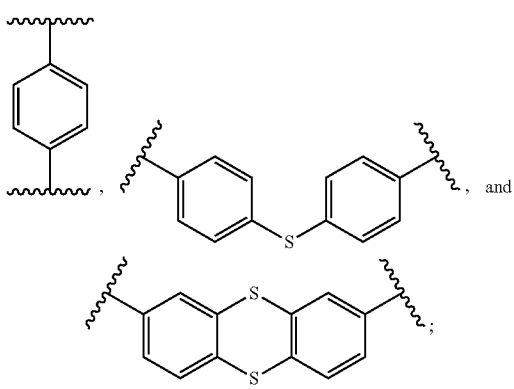

or
x is 2, and
each R group marked with '*' is independently selected from the group consisting of:

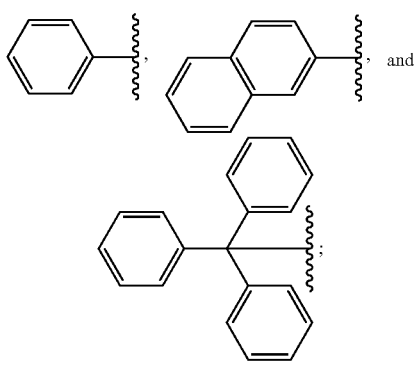

and
each R group marked with '**' is independently selected from the group consisting of:

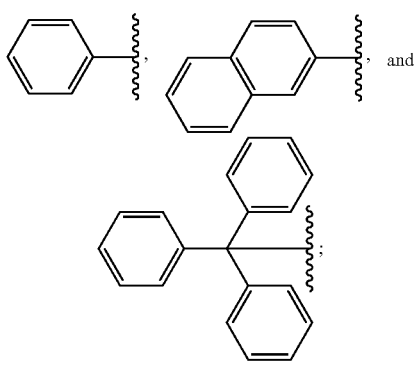

and a polymerization initiator.

2. The composition of claim 1, wherein the at least one writing monomer has a refractive index equal to or above about 1.58.

3. The composition of claim 1, wherein the polymerization initiator is selected from the group consisting of a photoinitiator, a thermal initiator, and a redox initiator, wherein at least one of the following is true:

a) the photoinitiator is selected from the group consisting of acetophenone, benzophenone, 2-phenylacetophenone, 2,2-dimethoxy-2-phenylacetophenone, bis(2,4,6-trimethylbenzoyl)-phenylphosphineoxide, 2-hydroxy-4'-(2-hydroxyethoxy)-2-methylpropiophenone, 2-methyl-(4-methylthienyl)-2-morpholinyl-1-propan- 1-one, diphenyl (2,4,6-trimethylbenzoyl) phosphine oxide, ethyl (2,4,6-trimethylbenzoyl) phenyl phosphinate, lithium phenyl-2,4,6-trimethylbenzoylphosphinate,

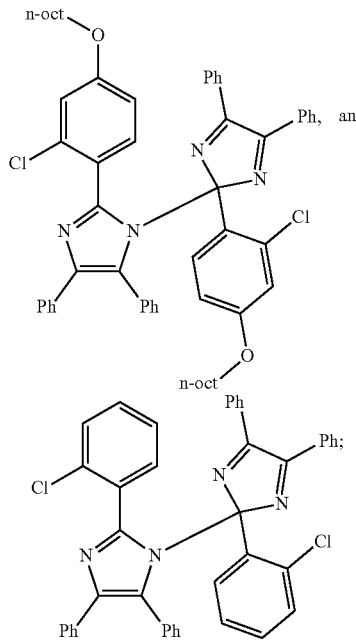

b) the thermal initiator is selected from the group consisting of tert-Amyl peroxybenzoate, 4,4-azobis (4-cyanovaleric acid), 1,1'-azobis (cyclohexanecarbonitrile), 2,2'-azobisisobutyronitrile (AIBN), benzoyl peroxide, 2,2-bis(tert-butylperoxy) butane, 1,1-bis(tert-butylperoxy) cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-Butyl hydroperoxide, tert-butyl peracetate, tert-butyl peroxide, tert-butyl peroxybenzoate, tert-Butylperoxy isopropyl carbonate, cumene hydroperoxide, cyclohexanone peroxide, dicumyl peroxide, lauroyl peroxide, 2,4-pentanedione peroxide, peracetic acid, and potassium persulfate; or c) the redox initiator is selected from the group consisting of sodium iodide/hydrogen peroxide, potassium iodide/hydrogen peroxide, benzoyl peroxide/dimethyaniline, benzoyl peroxide/N,N-dimethyl p-toluidine, benzoyl peroxide/4-N,N-dimethylaminophenethyl alcohol, benzoyl peroxide/ethyl 4-dimethylaminobenzoate, glucose oxidase/oxygen/iron (II) sulfate, and copper (II) sulfate/sodium ascorbate.

4. The composition of claim 1, wherein none of the writing monomers are covalently bound to the support matrix.

5. The composition of claim 1, wherein at least a portion of the writing monomer is covalently bound to at least a portion of a reversible addition-fragmentation chain transfer (RAFT) functionality in the support matrix.

6. The composition of claim 1, wherein the non-reactive counter diffusant has a refractive index equal to or less than about 1.5.

7. The composition of claim 1, wherein the at least one first multifunctional monomer is selected from the group consisting of:

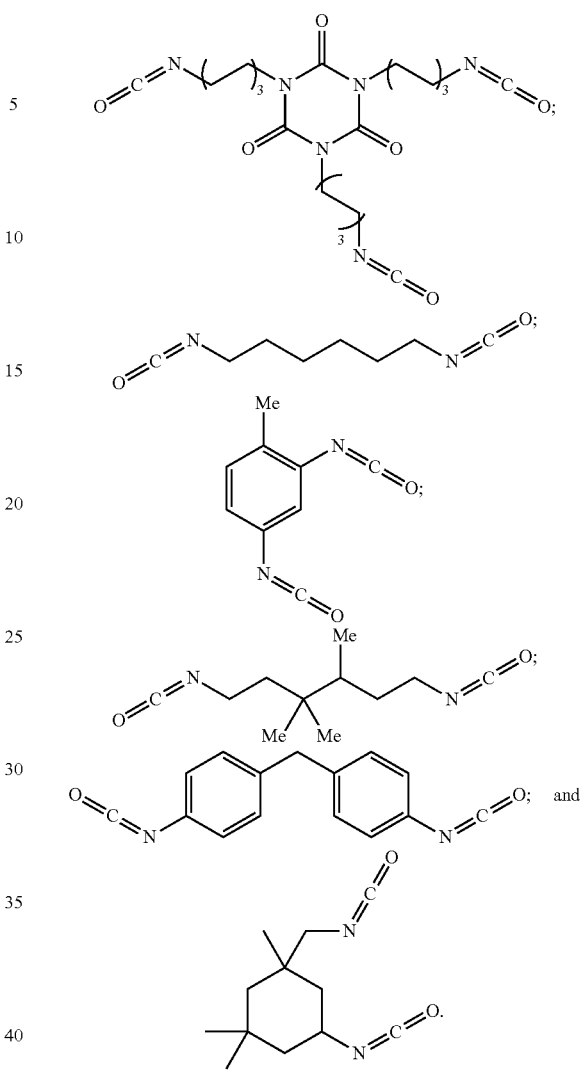

8. The composition of claim 1, wherein the non-reactive counter diffusant is selected from the group consisting of:

2,2,3,3,4,4,5,5,6,6,7,7,8,8,9,9-hexadecafluorononylbutyl carbamate, 2,2,2-trifluoroethylhexyl carbamate, bis(1,1,1,3,3,3-hexafluoropropan-2-yl)-(2,2,4-trimethylhexane-1,6-diyl) bis carbamate, 2,2,3,3,4,4,5,5,6,6,7,7-dodeca-fluoroheptylbutyl carbamate, 2,2,3,3,4,4,5,5,6,6,7,7-dodeca-fluoroheptylhexyl carbamate, 2,2,3,3,4,4,5,5,6,6,7,7-dodeca-fluoroheptyl propan-2-yl carbamate, 2,2,3,3,4,4,4-heptafluorobutylhexyl carbamate, 2,2,3,3,4,4,5,5,6,6,7,7,8,8,9,9-hexadecafluorononylhexyl carbamate, and 2,2,3,3,4,4,5,5,6,6,7,7,8,8,9,9-hexadecafluorononylcyclohexyl carbamate.

9. The composition of claim 1, wherein the at least one second multifunctional monomer is selected from the group consisting of

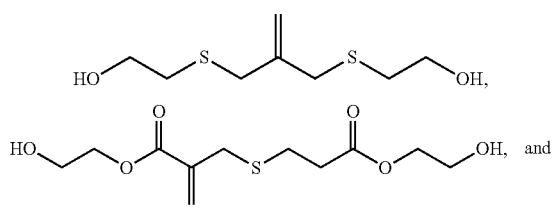

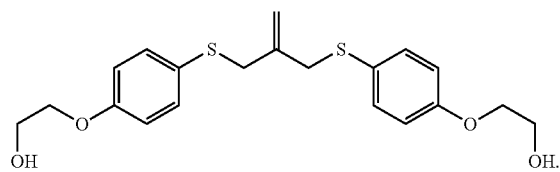

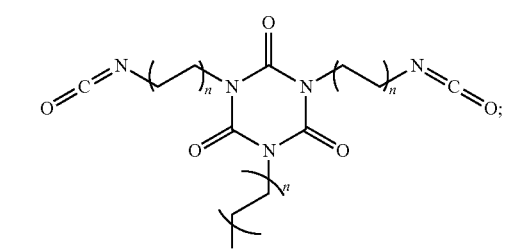

10. A method of making a holographic material, the method comprising:
(a) forming a reaction mixture consisting of:
(i) at least one first multifunctional monomer selected from the group consisting of

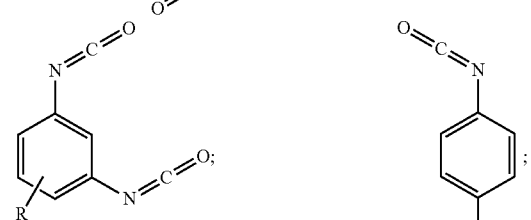

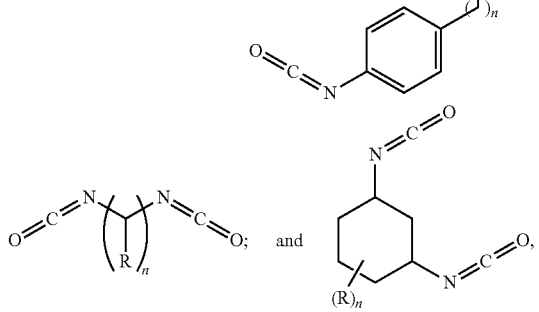

wherein
each occurrence of R is independently selected from the group consisting of H and C1-C10 alkyl;
each occurrence of n is independently 1, 2, 3, 4, 5, or 6;

(ii) at least one second multifunctional monomer of Formula (I):

$$X^1_{\phantom{1}R^1}\text{-}A\text{-}_{R^1}X^1,\quad (I)$$

wherein:
A is

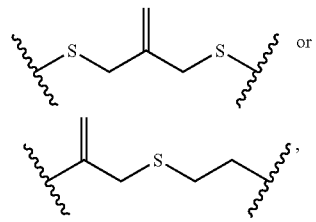

$R^1$ is selected from the group consisting of

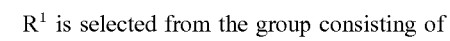

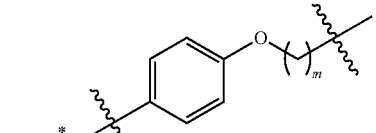

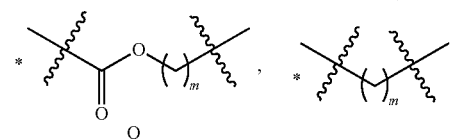

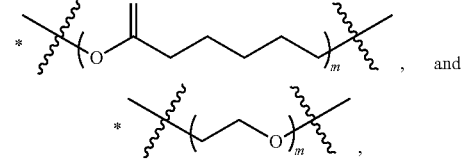

wherein the * denotes the point of attachment to A,
$X^1$ is OH,
m is an integer from 1 to 100;
(iii) at least one third multifunctional monomer selected from the group consisting of a straight chain perfluorocarbon diol, a polycaprolactone diol, a poly(tetrahydrofuran) diol, a poly (caprolactone-co-tetrahydrofuran) diol, a poly (ethylene glycol) diol, and a poly (butadiene) diol;
(iv) at least one writing monomer selected from the group consisting of tribromophenyl (meth) acrylate, pentabromophenyl (meth) acrylate, phenylthioethyl (meth) acrylate, naphthylthioethyl (meth) acrylate, tritylthioethyl (meth) acrylate,

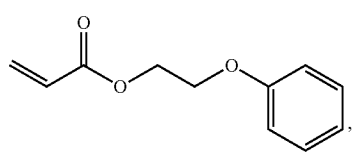

33

-continued

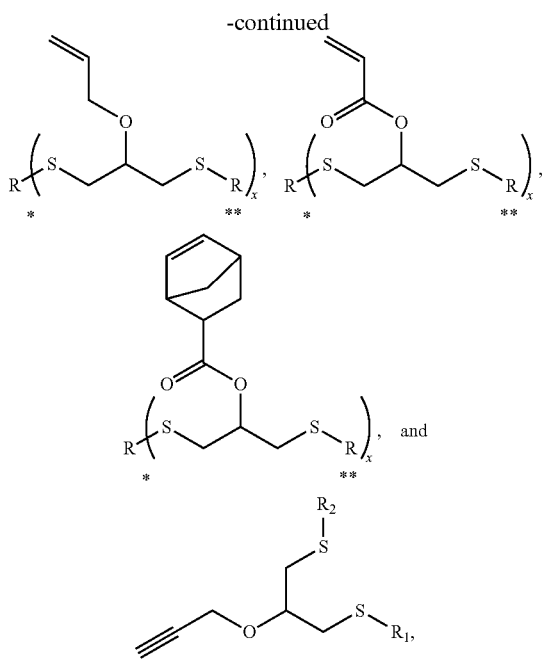

wherein in the at least one writing monomer:
R₁ and R₂ are independently selected from the group consisting of:

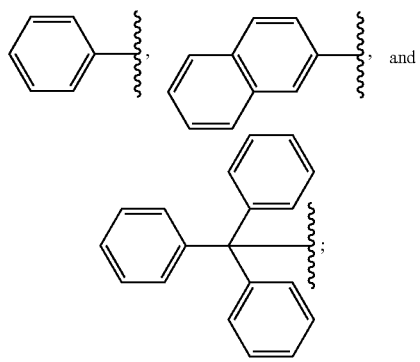

x is 1, and R groups marked with '*' and '**' are independently selected from the group consisting of:

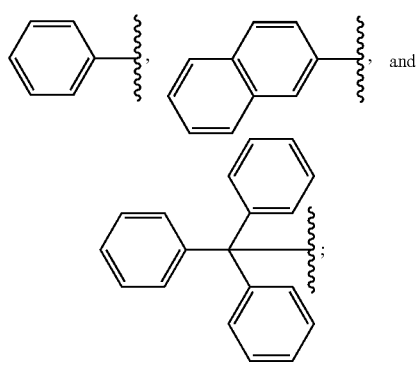

34 or
x is 2, and
each R group marked with '*' is independently selected from the group consisting of:

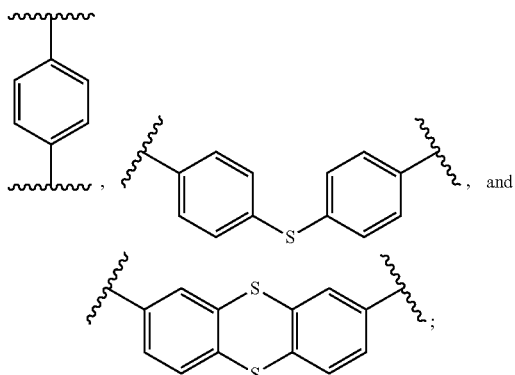

and
each R group marked with '**' is independently selected from the group consisting of:

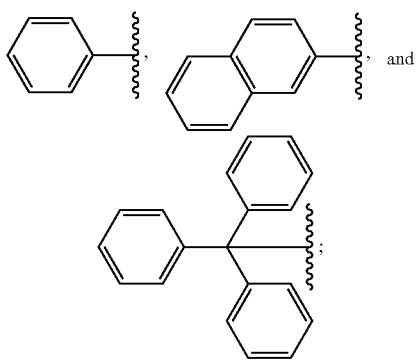

and
(v) at least one of a non-reactive counter diffusant and a polymerization initiator;
(b) polymerizing the reaction mixture such that the at least one first multifunctional monomer crosslinks the at least one third multifunctional monomer and the at least one second multifunctional monomer to form a covalently bound support matrix,
wherein the at least one writing monomer is unbound and capable of moving freely within the support matrix and wherein at least a portion of the support matrix is swollen with the at least one writing monomer,
wherein the polymerizing is through at least one method selected from the group consisting of thermally initiated polymerization, photopolymerization, and redox initiated polymerization;
(c) optionally, activating the RAFT functionalities in the at least one second multifunctional monomer in order to induce support matrix network rearrangement; and
(d) polymerizing the at least one writing monomer.
11. The method of claim 10, wherein step (c) is carried out and the RAFT functionalities are activated through at least one means selected from the group consisting of thermal initiation, photoinitiation, and redox initiation.

12. The method of claim 10, wherein the at least one writing monomer is polymerized with spatial selectivity in step (d).

13. The method of claim 10, wherein the at least one writing monomer is polymerized through photopolymerization in step (d).

14. The method of claim 10, wherein the polymerization in step (b) does not induce polymerization of the writing monomer and does not activate any of the RAFT functionalities of the at least one second multifunctional monomer.

15. The method of claim 10, wherein steps (c) and (d) are carried out simultaneously, wherein the activation of the RAFT functionalities of the at least one second multifunctional monomer also induces polymerization of the at least one writing monomer.

16. The method of claim 10, wherein the at least one first multifunctional monomer is selected from the group consisting of:

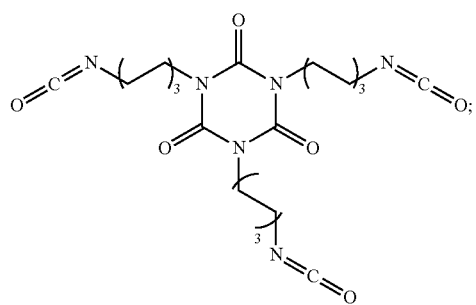

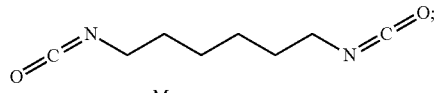

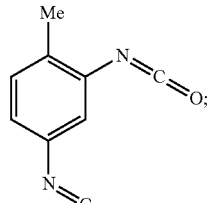

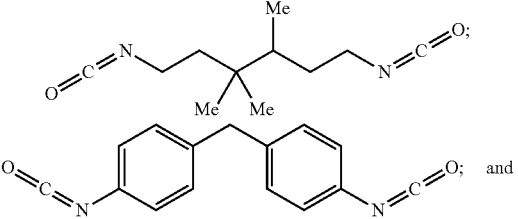

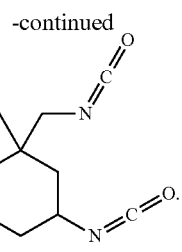

17. The method of claim 10, wherein the non-reactive counter diffusant is selected from the group consisting of:
- 2,2,3,3,4,4,5,5,6,6,7,7,8,8,9,9-hexadecafluorononylbutyl carbamate,
- 2,2,2-trifluoroethylhexyl carbamate,
- bis(1,1,1,3,3,3-hexafluoropropan-2-yl)-(2,2,4-trimethyl-hexane-1,6-diyl) bis carbamate,
- 2,2,3,3,4,4,5,5,6,6,7,7-dodeca-fluoroheptylbutyl carbamate,
- 2,2,3,3,4,4,5,5,6,6,7,7-dodeca-fluoroheptylhexyl carbamate,
- 2,2,3,3,4,4,5,5,6,6,7,7-dodeca-fluoroheptyl propan-2-yl carbamate,
- 2,2,3,3,4,4,4-heptafluorobutylhexyl carbamate,
- 2,2,3,3,4,4,5,5,6,6,7,7,8,8,9,9-hexadecafluorononylhexyl carbamate, and
- 2,2,3,3,4,4,5,5,6,6,7,7,8,8,9,9-hexadecafluorononylcyclohexyl carbamate.

18. The method of claim 10, wherein the at least one second multifunctional monomer is selected from the group consisting of

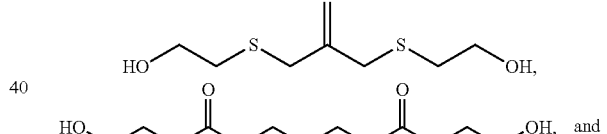

* * * * *